US011961996B2

United States Patent
Yamada et al.

(10) Patent No.: US 11,961,996 B2
(45) Date of Patent: Apr. 16, 2024

(54) NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

(71) Applicant: MITSUBISHI CHEMICAL CORPORATION, Chiyoda-ku (JP)

(72) Inventors: Shunsuke Yamada, Chiyoda-ku (JP); Nobuyuki Ishiwatari, Chiyoda-ku (JP); Naoto Maru, Chiyoda-ku (JP); Atsushi Watarai, Chiyoda-ku (JP)

(73) Assignee: MITSUBISHI CHEMICAL CORPORATION, Chiyoda-ku (JP)

(*) Notice: Subject to any disclaimer, the term of this patent is extended or adjusted under 35 U.S.C. 154(b) by 0 days.

(21) Appl. No.: 16/419,744

(22) Filed: May 22, 2019

(65) Prior Publication Data
US 2019/0273248 A1    Sep. 5, 2019

Related U.S. Application Data

(63) Continuation of application No. PCT/JP2017/042108, filed on Nov. 22, 2017.

(30) Foreign Application Priority Data

Nov. 22, 2016 (JP) ................. 2016-227259

(51) Int. Cl.
| | |
|---|---|
| *H01M 4/36* | (2006.01) |
| *H01M 4/02* | (2006.01) |
| *H01M 4/38* | (2006.01) |
| *H01M 4/48* | (2010.01) |
| *H01M 4/587* | (2010.01) |
| *H01M 10/052* | (2010.01) |
| *H01M 10/0525* | (2010.01) |
| *H01M 10/0567* | (2010.01) |

(52) U.S. Cl.
CPC ............ *H01M 4/364* (2013.01); *H01M 4/36* (2013.01); *H01M 4/38* (2013.01); *H01M 4/48* (2013.01); *H01M 4/483* (2013.01); *H01M 4/587* (2013.01); *H01M 10/052* (2013.01); *H01M 10/0525* (2013.01); *H01M 10/0567* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2011/0159368 | A1* | 6/2011 | Hirose | H01M 4/48 429/219 |
| 2011/0171532 | A1 | 7/2011 | Okanishi et al. | |
| 2013/0059203 | A1 | 3/2013 | Hong et al. | |
| 2014/0234705 | A1 | 8/2014 | Yayamoto et al. | |
| 2016/0079591 | A1 | 3/2016 | Yang et al. | |
| 2016/0087264 | A1 | 3/2016 | Osada et al. | |
| 2016/0156025 | A1 | 6/2016 | Shin et al. | |
| 2016/0351947 | A1* | 12/2016 | Kamo | H01M 4/0471 |
| 2017/0149100 | A1* | 5/2017 | Ishii | H01M 10/058 |
| 2018/0013146 | A1* | 1/2018 | Yamada | H01M 4/362 |
| 2018/0053935 | A1 | 2/2018 | Azami | |
| 2019/0356014 | A1* | 11/2019 | Abe | H01M 4/505 |

FOREIGN PATENT DOCUMENTS

| | | | |
|---|---|---|---|
| CN | 102067363 | A | 5/2011 |
| CN | 102934265 | A | 2/2013 |
| CN | 104282940 | A | 1/2015 |
| CN | 104638237 | A | 5/2015 |
| CN | 105164836 | A | 12/2015 |
| CN | 105409035 | A | 3/2016 |
| CN | 106133990 | A | 11/2016 |
| CN | 108713266 | A | 10/2018 |
| JP | 2009205950 | A * | 9/2009 |
| JP | 2013-101921 | | 5/2013 |
| JP | 2013-200983 | | 10/2013 |

(Continued)

OTHER PUBLICATIONS

WO2017155021A1_Description_202009241157_Machine_Translation.*
JP2009205950A_Description_202009251436_Machine_Translation.*
JP2013200984A_Description_202009241410_Machine_Translation.*
International Search Report dated Feb. 13, 2018 in PCT/JP2017/042108 filed Nov. 22, 2017.
English translation of the International Preliminary Report on Patentability and Written Opinion dated Jun. 6, 2019 in PCT/JP2017/042108.

(Continued)

*Primary Examiner* — Brian R Ohara
*Assistant Examiner* — Patrick Marshall Greene
(74) *Attorney, Agent, or Firm* — Oblon, McClelland, Maier & Neustadt, L.L.P.

(57) ABSTRACT

Provided are: a negative electrode material for nonaqueous secondary batteries, which can yield a high-capacity nonaqueous secondary battery having excellent discharge rate characteristics; and a negative electrode for nonaqueous secondary batteries and a nonaqueous secondary battery. Also provided is a nonaqueous secondary battery having excellent charge-discharge efficiency. The negative electrode material for nonaqueous secondary batteries includes carbonaceous particles (A) and silicon oxide particles (B), and satisfies the followings: a) the average particle size (50% cumulative particle size from the smaller particle side; d50) is 3 μm to 30 μm, and the 10% cumulative particle size from the smaller particle side (d10) is 0.1 μm to 10 μm; b) the ratio (R1=d90/d10) between the 90% cumulative particle size from the smaller particle side (d90) and the d10 is 3 to 20; and c) the ratio (R2=d50/d10) between the d50 and the d10 is 1.7 to 5.

16 Claims, No Drawings

(56) References Cited

FOREIGN PATENT DOCUMENTS

| | | |
|---|---|---|
| JP | 2013-200984 | 10/2013 |
| JP | 2015-18802 A | 1/2015 |
| JP | 2015-106437 | 6/2015 |
| JP | 2015-191853 | 11/2015 |
| JP | 2016-62810 | 4/2016 |
| JP | 2016-103337 | 6/2016 |
| KR | 10-2016-0101850 A | 8/2016 |
| WO | WO2013/054500 A1 | 4/2013 |
| WO | WO 2016/113952 A1 | 7/2016 |
| WO | WO2016/152877 A1 | 9/2016 |
| WO | WO2017/155021 A1 | 9/2017 |

OTHER PUBLICATIONS

Office Action and Search Report dated Sep. 1, 2021 issued in the corresponding Chinese application No. 201780072248.0 with machine translation.
Combined Chinese Office Action and Search Report dated Mar. 8, 2022 in Patent Application No. 201780072248.0 (with English machine translation), citing documents AO-AS therein, 14 pages.
Office Action dated Jan. 17, 2022 in corresponding Korean Patent Application No. 10-2019-7015064 (with English Translation), citing documents AO and AP therein, 11 pages.

\* cited by examiner

NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

CROSS-REFERENCE TO RELATED APPLICATION

This is a continuation of International Application PCT/JP2017/042108, filed on Nov. 22, 2017, and designated the U.S., and claims priority from Japanese Patent Application 2016-227259 which was filed on Nov. 22, 2016, the entire contents of which are incorporated herein by reference.

TECHNICAL FIELD

The present invention relates to: a negative electrode material for nonaqueous secondary batteries; a negative electrode for nonaqueous secondary batteries, which uses the same; and a nonaqueous secondary battery including the negative electrode.

BACKGROUND ART

In recent years, there is an increasing demand for high-capacity secondary batteries in association with size reduction in electronic appliances. Nonaqueous secondary batteries having higher energy density and superior rapid charge-discharge characteristics as compared to nickel-cadmium batteries and nickel-hydrogen batteries, particularly lithium ion secondary batteries, have been drawing attention. Especially, nonaqueous lithium secondary batteries, which include positive and negative electrodes capable of receiving and releasing lithium ions and a nonaqueous electrolyte solution containing a lithium salt dissolved therein, such as $LiPF_6$ or $LiBF_4$, have been developed and put into practical use.

Various materials have been proposed as negative electrode materials of such nonaqueous lithium secondary batteries, and carbonaceous particles made of a graphite, such as a natural graphite, an artificial graphite obtained by graphitization of coke or the like, a graphitized mesophase pitch or a graphitized carbon fiber, have been used because of their high capacity, excellent flatness of discharge potential, and the like. In addition, amorphous carbon materials have been used since, for example, they are relatively stable to some of electrolyte solutions. Moreover, carbon materials that are obtained by coating or adhering amorphous carbon on the surfaces of graphite particles and thereby imparted with two properties attributed to both graphite and amorphous carbon, namely a high capacity with small irreversible capacity and excellent stability with electrolyte solutions, respectively, have been used as well.

Meanwhile, for the purpose of further increasing the capacity of a lithium ion secondary battery, the use of a silicon oxide material in combination with such carbon materials has been examined. With regard to the use of a combination of a carbonaceous material and a silicon oxide material, Patent Document 1 discloses the use of carbonaceous particles having a carbon layer at least partially on the surfaces of graphite particles, and Patent Document 2 discloses the use of a mixture of a spheroidized graphite and a flake graphite as carbonaceous particles. Further, Patent Document 3 discloses the use of a negative electrode active substance composed of a combination of a graphite and a silicon oxide material, in which the silicon oxide material is blended in a large amount of 17 to 40% by mass. Moreover, Patent Document 4 discloses the use of a graphite and hardly graphitizable carbon particles as carbonaceous particles in combination with a silicon oxide material.

RELATED ART DOCUMENTS

Patent Documents

[Patent Document 1] Japanese Laid-open Patent Application (Kokai) No. 2013-200983
[Patent Document 2] Japanese Laid-open Patent Application (Kokai) No. 2013-200984
[Patent Document 3] WO 2013/054500
[Patent Document 4] WO 2016/152877

SUMMARY OF THE INVENTION

Problems to be Solved by the Invention

According to the studies conducted by the present inventors, it was found that lithium ion secondary batteries utilizing the negative electrode materials of Patent Documents 1 to 4 have a problem of being insufficient in terms of, for example, discharge capacity, rate characteristics, and charge-discharge efficiency.

That is, an object of the present invention is to provide: a negative electrode material for nonaqueous secondary batteries, which can yield a high-capacity nonaqueous secondary battery having excellent discharge rate characteristics; and a negative electrode for nonaqueous secondary batteries and a nonaqueous secondary battery, which include the negative electrode material.

Another object of the present invention is to provide a nonaqueous secondary battery having excellent charge-discharge efficiency.

Means for Solving the Problems

The present inventors intensively studied to solve the above-described problems and consequently discovered that the problems can be solved by controlling the particle size distribution of a negative electrode material for nonaqueous secondary batteries, which negative electrode material contains carbonaceous particles and silicon oxide particles, to be in an appropriate range.

That is, the gist of the present invention is as follows.

[1] A negative electrode material for nonaqueous secondary batteries, the negative electrode material including carbonaceous particles (A) and silicon oxide particles (B) and satisfying the following a) to c):

a) the average particle size (50% cumulative particle size from the smaller particle side; d50) is 3 μm to 30 μm, and the 10% cumulative particle size from the smaller particle side (d10) is 0.1 μm to 10 μm;

b) the ratio (R1=d90/d10) between the 90% cumulative particle size from the smaller particle side (d90) and the d10 is 3 to 20; and c) the ratio (R2=d50/d10) between the d50 and the d10 is 1.7 to 5.

[2] The negative electrode material for nonaqueous secondary batteries according to [1], wherein the ratio (R3=$d50_b/d50_a$) between the average particle size of the silicon oxide particles (B) (50% cumulative particle size from the smaller particle side; $d50_b$) and the average particle size of the carbonaceous particles (A) (50% cumulative particle size from the smaller particle side; $d50_a$) is 0.01 to 1.

[3] The negative electrode material for nonaqueous secondary batteries according to [1] or [2], wherein the ratio (R4=$d50_b/d10_a$) between the $d50_b$ of the silicon oxide particles (B) and the 10% cumulative particle size from the smaller particle side ($d10_a$) of the carbonaceous particles (A) is 0.01 to 2.

[4] The negative electrode material for nonaqueous secondary batteries according to any one of [1] to [3], wherein, with regard to the carbonaceous particles (A), the $d50_a$ is 5 μm to 30 μm, and the ratio (R1, =$d90_a/d10_a$) between the 90% cumulative particle size from the smaller particle side ($d90_a$) and the 10% cumulative particle size from the smaller particle side ($d10_a$) is 3 to 10.

[5] The negative electrode material for nonaqueous secondary batteries according to any one of [1] to [4], wherein, with regard to the silicon oxide particles (B), the $d50_b$ is 0.1 μm to 20 μm, and the ratio (R1$_b$=$d90_b/d10_b$) between the 90% cumulative particle size from the smaller particle side ($d90_b$) and the 10% cumulative particle size from the smaller particle side ($d10_b$) is 3 to 15.

[6] The negative electrode material for nonaqueous secondary batteries according to any one of [1] to [5], wherein the 10% cumulative particle size from the smaller particle side ($d10_b$) of the silicon oxide particles (B) is 0.001 μm to 6 μm.

[7] The negative electrode material for nonaqueous secondary batteries according to any one of [1] to [6], including the carbonaceous particles (A) and the silicon oxide particles (B) at a ratio of 30:70 to 99:1 ([weight of carbonaceous particles (A)]:[weight of silicon oxide particles (B)]).

[8] The negative electrode material for nonaqueous secondary batteries according to any one of [1] to [7], wherein the carbonaceous particles (A) have a circularity of 0.88 or higher as determined by a flow-type particle image analysis.

[9] The negative electrode material for nonaqueous secondary batteries according to any one of [1] to [8], wherein the carbonaceous particles (A) contain a spheroidized graphite.

[10] The negative electrode material for nonaqueous secondary batteries according to any one of [1] to [9], wherein the ratio ($M_O/M_{Si}$) of the number of oxygen atoms (Mo) with respect to the number of silicon atoms (Mn) in the silicon oxide particles (B) is 0.5 to 1.6.

[11] The negative electrode material for nonaqueous secondary batteries according to any one of [1] to [10], wherein the silicon oxide particles (B) contain zero-valent silicon atoms.

[12] The negative electrode material for nonaqueous secondary batteries according to any one of [1] to [11], including silicon microcrystals in the silicon oxide particles (B).

[13] A negative electrode for nonaqueous secondary batteries, the negative electrode including: a current collector; and an active substance layer formed on the current collector, wherein the active substance layer contains the negative electrode material for nonaqueous secondary batteries according to any one of [1] to [12].

[14] A nonaqueous secondary battery including: a positive electrode; a negative electrode; and an electrolyte, wherein the negative electrode is the negative electrode for nonaqueous secondary batteries according to [13].

[15] The nonaqueous secondary battery according to [14], wherein the electrolyte is an electrolyte solution contained in a nonaqueous solvent.

[16] The nonaqueous secondary battery according to [15], wherein the electrolyte solution contains lithium difluorophosphate, and the content thereof is 0.01% by weight to 2% by weight with respect to the whole electrolyte solution.

Effects of the Invention

According to the present invention, a negative electrode material for nonaqueous secondary batteries, which has a high capacity and excellent discharge rate characteristics, as well as a negative electrode for nonaqueous secondary batteries and a nonaqueous secondary battery, which include the negative electrode material, are provided. In addition, according to the present invention, a nonaqueous secondary battery having excellent charge-discharge efficiency is provided.

MODE FOR CARRYING OUT THE INVENTION

The present invention will now be described in detail; however, the present invention is not restricted to the following descriptions and can be modified arbitrarily within a range that does not depart from the gist of the present invention. It is noted here that, in the present invention, those ranges that are expressed with "to" before and after numerical or physical property values each denote a range that includes the respective numerical or physical property values.

In the present specification, with regard to the negative electrode material for nonaqueous secondary batteries according to the present invention (hereinafter, may be referred to as "the negative electrode material of the present invention"), the average particle size (50% cumulative particle size from the smaller particle side), the 10% cumulative particle size from the smaller particle side, and the 90% cumulative particle size from the smaller particle side may be simply referred to as "d50", "d10" and "d90", respectively. The same also applies to the below-described other materials (A) and (B).

Further, with regard to the carbonaceous particles (A) used in the present invention, the average particle size (50% cumulative particle size from the smaller particle side), the 10% cumulative particle size from the smaller particle side, and the 90% cumulative particle size from the smaller particle side may be hereinafter simply referred to as "d50a", "d10a" and "$d90_a$", respectively.

Moreover, with regard to the silicon oxide particles (B) used in the present invention, the average particle size (50% cumulative particle size from the smaller particle side), the 10% cumulative particle size from the smaller particle side, and the 90% cumulative particle size from the smaller particle side may be hereinafter simply referred to as "d50%", "$d10_b$" and "$d90_b$", respectively.

The d50, d10, d90, $d50_a$, $d10_a$, $d90_a$, $d50_b$, $d10_b$ and $d90_b$ are values determined based on a volume-based particle size distribution in accordance with the method described below in the section of Examples.

[Negative Electrode Material]

The negative electrode material of the present invention includes carbonaceous particles (A) and silicon oxide particles (B) and satisfies the following a) to c):

a) the average particle size (50% cumulative particle size from the smaller particle side; d50) is 3 μm to 30 μm, and the 10% cumulative particle size from the smaller particle side (d10) is 0.1 μm to 10 μm;

b) the ratio (R1=d90/d10) between the 90% cumulative particle size from the smaller particle side (d90) and the d10 is 3 to 20; and c) the ratio (R2=d50/d10) between the d50 and the d10 is 1.7 to 5.

[Mechanism]

<Actions and Effects Based on Particle Size Distribution of Negative Electrode Material>

The negative electrode material of the present invention that satisfies the above-described a) to c) is characterized by having a broad particle size distribution and containing a large amount of fine powder (i.e., the particle size is distributed like a tensed band on the fine powder side in a particle size distribution chart).

By allowing the negative electrode material to have a broad particle size distribution, the presence of small particles between large particles increases the number of contact points between the particles and thereby suppresses breakage of conductive path, so that a large discharge capacity can be attained. Particularly, by having a greater number of particles on the fine powder side (i.e., a tensed band-like distribution profile), the contact-improving effect is enhanced, and this makes breakage of conductive path unlikely to occur even when the silicon oxide particles (B) greatly expand or contract, a large discharge capacity can be attained as a result.

Moreover, since the negative electrode material of the present invention not only simply contains a large amount of fine powder but also contains large-sized particles and thus has a broad particle size distribution, it is capable of appropriately forming a flow path of an electrolyte solution inside a negative electrode active substance layer and, therefore, favorable discharge rate characteristics are attained.

<Actions and Effects Based on Incorporation of Silicon Oxide Particles (B)>

By incorporating the silicon oxide particles (B) having a high capacity, a high-capacity negative electrode material can be obtained.

Particularly, by controlling the ratio ($M_O/M_{Si}$) of the number of oxygen atoms (Mo) with respect to the number of silicon atoms (Mn) in the silicon oxide particles (B) to be 0.5 to 1.6, the silicon oxide particles (B) is imparted with a high capacity and, at the same time, the amount of change in the volume, which is associated with reception and release of Li ions, is made small and close to that of the carbonaceous particles (A); therefore, deterioration of performance caused by the loss of contact with the carbonaceous particles (A) can be suppressed.

In addition, by allowing the silicon oxide particles (B) to contain zero-valent silicon atoms, the range of potential in which the silicon oxide particles (B) receive and release Li ions is made close to that of the carbonaceous particles (A), and a change in the volume associated with reception and release of Li ions thus takes place simultaneously with that of the carbonaceous particles (A); therefore, interfacial displacement between the carbonaceous particles (A) and the silicon oxide particles (B) is made less likely to occur, so that deterioration of performance caused by the loss of contact with the carbonaceous particles (A) can be suppressed.

<Actions and Effects Based on Particle Size Distribution of Carbonaceous Particles (A) and Silicon Oxide Particles (B)>

The carbonaceous particles (A) and the silicon oxide particles (B) themselves have a broad particle size distribution, and the silicon oxide particles (B) contain a large amount of fine powder; therefore, the same actions and effects as those attributed to the above-described particle size distribution in the negative electrode material can be obtained.

[Particle Size Distribution of Negative Electrode Material]

<d50>

When the d50 of the negative electrode material of the present invention is 3 µm or larger, an increase in the irreversible capacity caused by an increase in the specific surface area can be inhibited. Meanwhile, when the d50 is 30 µm or smaller, deterioration of the rapid charge-discharge characteristics due to a reduction in the contact area between an electrolyte solution and the particles of the negative electrode material can be inhibited. From these standpoints, the d50 is preferably 8 to 27 µm, still more preferably 10 to 25 µm, particularly preferably 12 to 23 µm.

<d10>

By controlling the d10 of the negative electrode material of the present invention to be 0.1 µm or larger, an increase in the specific surface area due to inclusion of an excessive amount of fine particles is suppressed, and the irreversible capacity can be reduced. Meanwhile, when the d10 is 10 µm or smaller, the above-described actions and effects exerted by incorporating a large amount of fine powder can be attained. The d10 is preferably 0.5 to 9 µm, more preferably 1 to 8 µm, still more preferably 3 to 7 µm.

<R1=d90/d10>

When the ratio (R1=d90/d10) between the d90 and the d10 of the negative electrode material is 3 or higher, since the particle size distribution is broad and small particles exist between large particles, the number of contact points between the particles is increased and breakage of conductive path is thus suppressed; therefore, favorable discharge capacity and discharge rate characteristics are attained. Particularly, when the amount of the particles is greater on the fine powder side (i.e., a tensed band-like distribution profile) such that the below-described ratio of the d50 and the d10 (R2=d50/d10) is satisfied, the contact-improving effect is further improved, so that a negative electrode material having a favorable discharge capacity, in which breakage of conductive path is unlikely to occur even when the silicon oxide particles (B) greatly expand or contract, can be obtained.

Meanwhile, when the ratio (R1=d90/d10) of the d90 and the d10 is 20 or lower, not only the occurrence of a process defect caused by an increase in the amount of coarse particles (i.e., an excessively large d90), such as formation of streaks on an electrode, as well as deterioration of the high-current-density charge-discharge characteristics and the low-temperature input-output characteristics can be inhibited, but also an increase in the specific surface area due to the presence of extremely small particles and inclusion of an excessive amount of fine particles (i.e., an excessively small d10) can be suppressed to reduce the irreversible capacity.

For the above-described reasons, the ratio (R1=d90/d10) is preferably 3.2 to 15, more preferably 3.4 to 10, still more preferably 3.5 to 8.

<R2=d50/d10>

For the same reasons as described above for the ratio of the d90 and the d10 (R1=d90/d10), the ratio (R2=d50/d10) of the d50 and the d10 is 1.7 to 5.

This ratio (R2=d50/d10) is preferably 1.8 to 4, more preferably 1.9 to 3.

<d90>

From not only the standpoint of inhibiting the occurrence of a process defect caused by an increase in the amount of coarse particles, such as formation of streaks on an electrode, as well as deterioration of the high-current-density charge-discharge characteristics and the low-temperature input-output characteristics, but also the standpoint of allowing an appropriate amount of large particles to exist and thereby ensuring spaces for small particles so as to improve the discharge capacity and inhibit a reduction in the negative electrode strength and a decrease in the initial charge-discharge efficiency, the d90 of the negative electrode material of the present invention is preferably 10 μm to 100 μm, more preferably 15 to 60 μm, particularly preferably 20 to 40 μm.

[Other Physical Properties of Negative Electrode Material]
<Tap Density>

The tap density of the negative electrode material of the present invention is preferably 0.8 to 1.8 g/cm³, more preferably 0.9 to 1.7 g/cm³, still more preferably 1.0 to 1.6 g/cm³. When the negative electrode material having a tap density in this range is used as a negative electrode, an electrolyte solution and the silicon oxide particles (B) can exist in gaps formed by the carbonaceous particles (A), so that an increase in the capacity and an improvement in the rate characteristics can be more likely to be realized.

The tap density is determined by the method described below in the section of Examples.

<Specific Surface Area>

The specific surface area of the negative electrode material of the present invention, which is determined by a BET method, is usually 0.5 m²/g or larger, preferably 2 m²/g or larger, more preferably 3 m²/g or larger, still more preferably 4 m²/g or larger, particularly preferably 5 m²/g or larger, but usually 11 m²/g or smaller, preferably 9 m²/g or smaller, more preferably 8 m²/g or smaller, still more preferably 7 m²/g or smaller, particularly preferably 6.5 m²/g or smaller. When the specific surface area is the above-described lower limit value or larger, sites for entry and exit of Li are likely to be secured; therefore, such a specific surface area is preferred from the standpoint of the rapid charge-discharge characteristics, output characteristics, and low-temperature input-output characteristics of a lithium ion secondary battery. Meanwhile, when the specific surface area is the above-described upper limit value or smaller, the activity of active substance with an electrolyte solution is controlled in an appropriate range; therefore, a reduction in the battery initial charge-discharge efficiency and an increase in the gas generation, which are caused by an increase in side reactions with the electrolyte solution, are likely to be inhibited, and a reduction in the battery capacity tends to be suppressed as a result.

The specific surface area based on a BET method is determined by the method described below in the section of Examples.

[Content Ratio of Carbonaceous Particles (A) and Silicon Oxide Particles (B)]

The negative electrode material of the present invention preferably contains the carbonaceous particles (A) and the silicon oxide particles (B), which have the below-described particle size distributions and physical properties that are suitable for the present invention, at a ratio ([weight of carbonaceous particles (A)]:[weight of silicon oxide particles (B)]) of 30:70 to 99:1, particularly 40:60 to 98:3, especially 50:50 to 95:5. By mixing the carbonaceous particles (A) and the silicon oxide particles (B) at such a ratio, since the silicon oxide particles (B), which have a high capacity and show a small change in volume that is associated with reception and release of Li ions, are allowed to exist in the gaps formed by the carbonaceous particles (A), a high-capacity negative electrode material in which deterioration of performance caused by the loss of contact with the carbonaceous particles is limited can be obtained.

[Particle Size Distribution of Carbonaceous Particles (A) and Silicon Oxide Particles (B)]

<$R3 = d50_b/d50_a$>

The ratio ($R3 = d50_b/d50_a$) between the $d50_b$ of the silicon oxide particles (B) used in the present invention and the $d50_a$ of the carbonaceous particles (A) used in the present invention is preferably 0.01 to 1. When the ratio R3 ($=d50_b/d50_a$) is in this range, the silicon oxide particles (B) are allowed to exist in the gaps between the carbonaceous particles (A), and a further increase in the capacity can be realized because of the presence of the silicon oxide particles (B) having a higher theoretical capacity than the carbonaceous particles (A). A change in the volume of the silicon oxide particles (B), which is associated with reception and release of alkali ions such as Li ions induced by charging and discharging, is absorbed by the gaps formed by the carbonaceous particles (A); therefore, breakage of conductive path caused by such a change in the volume of the silicon oxide particles (B) is suppressed, as a result of which an improvement in the cycle characteristics and the rapid charge-discharge characteristics as well as an increase in the capacity can be realized. From this standpoint, the ratio R3 ($=d50_b/d50_a$) is more preferably 0.05 to 0.9, still more preferably 0.1 to 0.85, particularly preferably 0.15 to 0.8.

<$R4 = d50_b/d10_a$>

The ratio ($R4 = d50_b/d10_a$) between the $d50_b$ of the silicon oxide particles (B) used in the present invention and the $d10_a$ of the carbonaceous particles (A) used in the present invention is preferably 0.01 to 2. When the R4 ($=d50_b/d10_a$) is in this range and the average particle size $d50_b$ of the silicon oxide particles (B) is small at twice or less of the d10a of the carbonaceous particles (A), the above-described effects attributed to the entry of the silicon oxide particles (B) into the gaps between the carbonaceous particles (A) are likely to be attained. From this standpoint, the R4 ($=d50_b/d10_b$) is more preferably 0.1 to 1.7, still more preferably 0.2 to 1.5, particularly preferably 0.3 to 1.0.

<$R1_a = d90_a/d10_a$>

The carbonaceous particles (A) used in the present invention satisfy the below-described $d50_a$ as well as $d90_a$ and $d10_a$, and ratio of the $d90_a$ and the $d10_a$ ($R1_a = d90_a/d10_a$) is preferably 3 to 10. Since the particle size distribution in this range of $R1_a$ ($=d90_a/d10_b$) is broad, the negative electrode material has a broad particle size distribution, so that the actions and effects described above in the section of Particle Size Distribution of Negative Electrode Material can be certainly obtained. From this standpoint, the $R1_a$ ($=d90_a/d10_a$) is more preferably 3.3 to 8, still more preferably 3.5 to 6.

<$R1b = d90b/d10_b$>

The silicon oxide particles (B) used in the present invention satisfy the below-described $d50_b$ as well as d90b and $d10_b$, and ratio of the d90b and the $d10_b$ ($R1_b = d90b/d10_b$) is preferably 3 to 15. Since the particle size distribution in this range of $R1_b$ ($=d90b/d10_b$) is broad, the negative electrode material has a broad particle size distribution, so that the actions and effects described above in the section of Particle Size Distribution of Negative Electrode Material can be certainly obtained. From this standpoint, the $R1_b$ ($=d90b/d10_b$) is more preferably 5 to 12, still more preferably 5.5 to 10.

<$R2_a = d50_a/d10_a$>

The carbonaceous particles (A) used in the present invention satisfy the below-described $d50_a$ as well as $d90_a$ and $d10_a$, and ratio of the $d50_a$ and the $d10_a$ ($R2_a = d50a/d10_a$) is preferably 1.6 to 5. Since the particle size distribution in this range of $R2_a$ (=$d50_a/d10_a$) is broad, the negative electrode material has a broad particle size distribution, so that the actions and effects described above in the section of Particle Size Distribution of Negative Electrode Material can be certainly obtained. From this standpoint, the $R2_a$ (=$d50_a/d10_a$) is more preferably 1.7 to 4, still more preferably 1.8 to 3.

<$R2b=d50_b/d10_b$>

The silicon oxide particles (B) used in the present invention satisfy the below-described $d50_b$, as well as d90b and $d10_b$, and ratio of the $d50_b$, and the $d10_b$($R2b=d50_b/d10_b$) is preferably 2 to 8. Since the particle size distribution in this range of $R2_b$ (=$d50_b/d10_b$) is broad, the negative electrode material has a broad particle size distribution, so that the actions and effects described above in the section of Particle Size Distribution of Negative Electrode Material can be certainly obtained. From this standpoint, the $R2_b$ (=$d50_b/d10_b$) is more preferably 2.6 to 7, still more preferably 3 to 6.

<$d50_a$, $d10_a$, $d90_a$>

The $d50_a$ of the carbonaceous particles (A) used in the present invention is preferably 5 µm to 30 µm. When the $d50_a$ of the carbonaceous particles (A) is 5 µm or larger, an increase in the irreversible capacity due to an increase in the specific surface area can be inhibited. Meanwhile, when the d50, of the carbonaceous particles (A) is 30 µm or smaller, deterioration of the rapid charge-discharge characteristics, which is caused by a decrease in the contact area between an electrolyte solution and the particles of the negative electrode material, can be inhibited in a lithium ion secondary battery. From the above-described standpoint, the $d50_a$ of the carbonaceous particles (A) is more preferably 8 to 27 µm, still more preferably 10 to 25 µm, particularly preferably 12 to 23 µm.

The $d10_a$ of the carbonaceous particles (A) used in the present invention is preferably 1 µm to 15 µm. When the $d10_a$ is 1 µm or larger, the occurrence of a process defect such as an increase in the slurry viscosity, a reduction in the electrode strength and a reduction in the initial charge-discharge efficiency can be inhibited and, when the $d10_a$ is 15 µm or smaller, deterioration of the high-current-density charge-discharge characteristics and low-temperature input-output characteristics of a battery can be inhibited. From this standpoint, the $d10_a$ of the carbonaceous particles (A) is more preferably 3 to 10 µm, still more preferably 5 to 9 µm, particularly preferably 6 to 8 µm.

The $d90_a$ of the carbonaceous particles (A) used in the present invention is preferably 10 µm to 100 µm. When the $d90_a$ is 10 µm or larger, a reduction in the negative electrode strength and a reduction in the initial charge-discharge efficiency can be inhibited and, when the $d90_a$ is 100 µm or smaller, the occurrence of a process defect such as streak formation as well as deterioration of the high-current-density charge-discharge characteristics and low-temperature input-output characteristics of a battery can be inhibited. From this standpoint, the $d90_a$ of the carbonaceous particles (A) is more preferably 15 to 60 µm, still more preferably 17 to 40 µm, particularly preferably 20 to 30 µm.

<$d50_b$, $d10_b$, d90b>

The $d50_b$ of the silicon oxide particles (B) used in the present invention is preferably 0.1 µm to 20 µm. With the $d50_b$, of the silicon oxide particles (B) being in this range, when the silicon oxide particles (B) are incorporated into an electrode, the silicon oxide particles (B) exist in the gaps formed by the carbonaceous particles (A), and a change in the volume of the silicon oxide particles (B), which is associated with reception and release of alkali ions such as Li ions induced by charging and discharging, is absorbed by the gaps; therefore, breakage of conductive path caused by such a volume change is suppressed, as a result of which the cycle characteristics can be improved. From these standpoints, the $d50_b$ of the silicon oxide particles (B) is more preferably 0.3 to 15 µm, still more preferably 0.4 to 10 µm, particularly preferably 0.5 to 8 µm.

The $d10_b$ of the silicon oxide particles (B) used in the present invention is preferably 0.001 µm to 6 µm. When the $d10_b$ of the silicon oxide particles (B) is in this range, a good conductive path can be formed because of the presence of appropriate fine powder of the silicon oxide particles (B) in the gaps between the carbonaceous particles (A); therefore, not only favorable cycle characteristics can be attained but also an increase in the specific surface area is suppressed and the irreversible capacity can thereby be reduced. From these standpoints, the $d10_b$ of the silicon oxide particles (B) is more preferably 0.01 to 4 µm, still more preferably 0.1 to 3 µm.

The d90b of the silicon oxide particles (B) used in the present invention is preferably 0.5 µm to 30 µm. When the d90b is in this range, since the silicon oxide particles (B) are likely to exist in the gaps between the carbonaceous particles (A), a good conductive path can be formed, and favorable cycle characteristics are thereby attained. From this standpoint, the $d90_b$ of the silicon oxide particles (B) is more preferably 0.8 to 20 µm, still more preferably 1 to 15 µm, particularly preferably 1.2 to 12 µm.

[Other Physical Properties of Carbonaceous Particles (A)]

<Circularity>

The carbonaceous particles (A) used in the present invention have a circularity of preferably 0.88 or higher as determined by a flow-type particle image analysis in accordance with the method described below in the section of Examples. By using the carbonaceous particles (A) having such a high circularity, the high-current-density charge-discharge characteristics can be improved.

A method of improving the circularity of the carbonaceous particles (A) is not particularly restricted; however, a method of performing a spheroidization treatment to make the carbonaceous particles (A) spherical is preferred since voids between the resulting particles have a uniform shape when an electrode is produced using the particles. Examples of a spheroidization method include a method in which a shearing force or a compressive force is applied so as to mechanically make the shape of particles close to being spherical, and a mechanical/physical treatment method in which plural fine particles are granulated by means of the adhesive force of a binder or the fine particles themselves.

The circularity of the carbonaceous particles (A) is more preferably 0.9 or higher, particularly preferably 0.92 or higher, but usually 1 or lower, preferably 0.98 or lower, more preferably 0.95 or lower. An excessively low circularity tends to result in deterioration of the high-current-density charge-discharge characteristics. Meanwhile, an excessively high circularity makes the carbonaceous particles (A) true-spherical; therefore, the contact area between the carbonaceous particles (A) is reduced, and the cycle characteristics of a lithium ion secondary battery obtained using the carbonaceous particles (A) may be deteriorated.

<Tap Density>

The carbonaceous particles (A) used in the present invention have a tap density of usually 0.50 g/cm$^3$ or higher, preferably 0.75 g/cm$^3$ or higher, more preferably 0.85 g/cm$^3$ or higher, still more preferably 0.90 g/cm$^3$ or higher, but usually 1.40 g/cm$^3$ or lower, preferably 1.35 g/cm$^3$ or lower, more preferably 1.20 g/cm$^3$ or lower, still more preferably 1.10 g/cm$^3$ or lower.

An excessively low tap density makes it difficult to increase the packing density of the carbonaceous particles (A) used in the present invention when the carbonaceous particles (A) are used as a negative electrode, and this tends to make it difficult to obtain a high-capacity lithium ion secondary battery. Meanwhile, when the tap density is not higher than the above-described upper limit value, since the amount of voids between the particles in the electrode is prevented from being excessively small, the conductivity between the particles is likely to be ensured, and this tends to make it easier to attain preferable battery characteristics.

The tap density is determined by the method described below in the section of Examples.

<Specific Surface Area>

The carbonaceous particles (A) used in the present invention have a specific surface area, which is determined by a BET method, of usually 0.5 m$^2$/g or larger, preferably 1 m$^2$/g or larger, more preferably 2 m$^2$/g or larger, still more preferably 3 m$^2$/g or larger, particularly preferably 4 m$^2$/g or larger, but usually 30 m$^2$/g or smaller, preferably 20 m$^2$/g or smaller, more preferably 10 m$^2$/g or smaller, still more preferably 7 m$^2$/g or smaller, particularly preferably 6.5 m$^2$/g or smaller. When the specific surface area is smaller than this range, since the amount of sites for entry and exit of Li is small, the rapid charge-discharge characteristics, output characteristics and low-temperature input-output characteristics of a lithium ion secondary battery are deteriorated, whereas when the specific surface area is larger than this range, since the activity of active substance with an electrolyte solution is excessively high, an increase in side reactions with the electrolyte solution causes a reduction in the battery initial charge-discharge efficiency and an increase in the gas generation, and the battery capacity tends to be reduced as a result.

The specific surface area based on a BET method is determined by the method described below in the section of Examples.

<Interplanar Spacing (d002) of (002) Planes and Crystallite Size (Lc)>

In the carbonaceous particles (A) used in the present invention, the value of the interplanar spacing d (interlayer distance (d002)) of lattice planes ((002) planes), which is determined by X-ray wide-angle diffractometry in accordance with the method of the Japan Society for the Promotion of Science, is preferably 0.338 nm or smaller, more preferably 0.337 nm or smaller. An excessively large d002 value indicates that the crystallinity of the carbonaceous particles (A) is low, and this may lead to an increase in the initial irreversible capacity of a lithium ion secondary battery. Meanwhile, the interplanar spacing of the (002) planes of the carbonaceous particles (A) is usually 0.335 nm or larger since the theoretical value thereof is 0.335 nm.

Further, in the carbonaceous particles (A) used in the present invention, the crystallite size (Lc), which is determined by X-ray wide-angle diffractometry in accordance with the method of the Japan Society for the Promotion of Science, is in a range of usually 1.5 nm or larger, preferably 3.0 nm or larger. When the crystallite size (Lc) is smaller than this range, the particles have a low crystallinity, and this may lead to a reduction in the reversible capacity of a lithium ion secondary battery. The above-described lower limit is the theoretical value for graphites.

The (d002) and the (Lc) can be determined by the method described below in the section of Examples.

<Raman R value>

The Raman R value is defined as the intensity ratio R (R=IB/IA) in a Raman spectrum obtained by Raman spectroscopy, where IA is the intensity of a peak PA near 1,580 cm$^{-1}$ and IB is the intensity of a peak PB near 1,360 cm$^{-1}$. It is noted here that "near 1,580 cm$^{-1}$" refers to a range of 1,580 to 1,620 cm$^{-1}$ and "near 1,360 cm$^{-1}$" refers to a range of 1,350 to 1,370 cm$^{-1}$.

The Raman R value of the carbonaceous particles (A) used in the present invention is usually 0.01 or larger, preferably 0.05 or larger, more preferably 0.10 or larger, still more preferably 0.20 or larger, but usually 1.00 or smaller, preferably 0.70 or smaller, more preferably 0.40 or smaller, still more preferably 0.35 or smaller.

An excessively small Raman R value means that the particle surfaces are not sufficiently damaged in a mechanical energy treatment of graphitic particles or the like in the production process of the carbonaceous particles (A) used in the present invention. Accordingly, in the carbonaceous particles (A), the amount of sites for receiving and releasing Li ions, such as fine cracks, breaks and structural defects that are generated by damage on the surfaces of the graphitic particles or the like, is small; therefore, the rapid charge-discharge characteristics for Li ions may be deteriorated in a lithium ion secondary battery.

Meanwhile, a large Raman R value indicates that, for example, the amount of amorphous carbon coating the graphitic particles or the like is large and/or the amount of fine cracks, breaks and structural defects on the surfaces of the graphitic particles or the like is overly large due to excessive mechanical energy treatment. When the Raman R value is excessively large, an increase in the effect of the irreversible capacity of amorphous carbon and an increase in side reactions with an electrolyte solution cause a reduction in the initial charge-discharge efficiency of a lithium ion secondary battery and an increase in the gas generation, and the battery capacity thereby tends to be reduced.

The Raman spectrum can be measured using a Raman spectroscope. Specifically, a sample is loaded by letting the particles to be measured free-fall into a measuring cell, and the measurement is performed while irradiating an argon-ion laser beam into the measuring cell and rotating the measuring cell in a plane perpendicular to the laser beam.

Wavelength of argon-ion laser beam: 514.5 nm
Laser power on sample: 25 mW
Resolution: 4 cm$^{-1}$
Measurement range: 1,100 cm$^{-1}$ to 1,730 cm$^{-1}$
Measurement of peak intensity and measurement of peak half-width: background processing, smoothing (convolution by simple average, 5 points)

[Other Physical Properties of Silicon Oxide Particles (B)]

<Specific Surface Area>

The silicon oxide particles (B) used in the present invention have a specific surface area, which is determined by a BET method, of preferably 80 m$^2$/g or smaller, more preferably 60 m$^2$/g or smaller, but preferably 0.5 m$^2$/g or larger, more preferably 1 m$^2$/g or larger, still more preferably 1.5 m$^2$/g or larger. When the specific surface area of the silicon oxide particles (B) based on a BET method is in this range, the input-output efficiency of alkali ions such as lithium ions can be favorably maintained, and the silicon oxide particles (B) have a preferred size; therefore, the silicon oxide particles (B) is allowed to exist in the gaps formed by the carbonaceous particles (A) and can thereby secure a conductive path with the carbonaceous particles (A). Further, since the silicon oxide particles (B) have a preferred size, an increase in the irreversible capacity is suppressed and a high capacity can thereby be ensured.

The specific surface area based on a BET method is determined by the method described below in the section of Examples.

<Composition>

As described above in the section of [Mechanism], in the silicon oxide particles (B) used in the present invention, the ratio ($M_O/M_{Si}$) of the number of oxygen atoms ($M_O$) with respect to the number of silicon atoms ($M_{Si}$) is preferably 0.5 to 1.6. In addition, the silicon oxide particles (B) used in the present invention preferably contain zero-valent silicon atoms. Further, the silicon oxide particles (B) used in the present invention preferably contain crystallized silicon microcrystals.

The ratio $M_O/M_{Si}$ is more preferably 0.7 to 1.3, particularly preferably 0.8 to 1.2. When the ratio $M_O/M_{Si}$ is in this range, because of the presence of particles composed of highly active amorphous silicon oxide through which alkali ions such as Li ions readily move in and out, the silicon oxide particles (B) can attain a higher capacity than the carbonaceous particles (A), and a high cycle retainability can be achieved by an amorphous structure. Moreover, since the silicon oxide particles (B) are filled into the gaps formed by the carbonaceous particles (A) while maintaining contact with the carbonaceous particles (A), a change in the volume of the silicon oxide particles (B), which is associated with reception and release of alkali ions such as Li ions induced by charging and discharging, can be absorbed by the gaps. As a result, breakage of conductive path caused by such a change in the volume of the silicon oxide particles (B) can be suppressed.

In solid-state NMR ($^{29}$Si-DDMAS) spectrometry, it is preferred that the silicon oxide particles (B) containing zero-valent silicon atoms have a broad peak (P1) normally appearing for silicon oxide, which is centered at about −110 ppm and whose apex is particularly in a range of −100 to −120 ppm, along with a broad peak (P2) which is centered at −70 ppm and whose apex is particularly in a range of −65 to −85 ppm. The area ratio of these peaks (P2/P1) is in a range of preferably 0.1 (P2)/(P1) 1.0, more preferably 0.2 (P2)/(P1) 0.8. By allowing the silicon oxide particles (B) containing zero-valent silicon atoms to have the above-described property, a negative electrode material having a large capacity and excellent cycle characteristics can be obtained.

Further, it is preferred that the silicon oxide particles (B) containing zero-valent silicon atoms generate hydrogen when reacted with an alkali hydroxide. The amount of the zero-valent silicon atoms in the silicon oxide particles (B), which is calculated from the amount of hydrogen generated in this process, is preferably 2 to 45% by weight, more preferably about 5 to 36% by weight, still more preferably about 10 to 30% by weight. When the amount of the zero-valent silicon atoms is less than 2% by weight, the charge-discharge capacity may be small, whereas when this amount is greater than 45% by weight, the cycle characteristics may be deteriorated.

The silicon oxide particles (B) containing silicon microcrystals preferably have the following properties.

i. In X-ray diffractometry (Cu-Kα) using copper as a counter electrode, a diffraction peak centered at about 25=28.4°, which is attributable to Si(111), is observed, and the particle size of silicon crystals, which is determined by the Scherrer equation based on the spread of the diffraction line, is preferably 1 to 500 nm, more preferably 2 to 200 nm, still more preferably 2 to 20 nm. When the size of the silicon fine particles is smaller than 1 nm, the charge-discharge capacity may be small, whereas when this size is larger than 500 nm, since the silicon fine particles greatly expand and contract during charging and discharging, the cycle characteristics may be deteriorated. It is noted here that the size of the silicon fine particles can be measured on a transmission electron micrograph.

ii. In solid-state NMR ($^{29}$Si-DDMAS) spectrometry, the spectrum thereof has a broad peak of silicon dioxide that is centered at about −110 ppm, along with a peak at about −84 ppm, which is characteristic to Si diamond crystals. It is noted here that this spectrum is completely different from those of ordinary silicon oxides (SiOx, x=1.0+a), and the structure of the silicon oxide particles (B) itself is thus clearly different. Further, under a transmission electron microscope, it is confirmed that silicon crystals are dispersed in amorphous silicon dioxide.

The amount of the silicon microcrystals in the silicon oxide particles (B) is preferably 2 to 45% by weight, more preferably about 5 to 36% by weight, still more preferably about 10 to 30% by weight. When the amount of the silicon microcrystals is less than 2% by weight, the charge-discharge capacity may be small, whereas when this amount is greater than 45% by weight, the cycle characteristics may be poor.

[Method of Producing Carbonaceous Particles (A)]

A method of producing the carbonaceous particles (A) used in the present invention is not particularly restricted; however, the carbonaceous particles (A) are preferably produced by the following method since the carbonaceous particles (A) satisfying the above-described particle size distribution and physical properties can be easily produced.

As described below, the carbonaceous particles (A) used in the present invention may be constituted by a single kind of carbonaceous particles or by mixing two or more kinds of carbonaceous particles, and highly circular carbonaceous particles (A) containing a spheroidized graphite can be obtained in either case.

<Case where Carbonaceous Particles (A) are Constituted by Single Kind of Carbonaceous Particles>

As a raw material of the carbonaceous particles (A) used in the present invention, it is preferred to use graphitic particles containing natural graphite and/or artificial graphite, or particles that have slightly lower crystallinity than such graphitic particles and contain a calcination product and/or a graphitization product of a material selected from the group consisting of coal coke, petroleum coke, furnace black, acetylene black and pitch-based carbon fibers, and it is more preferred to use graphitic particles containing natural graphite as a raw material since such graphitic particles are commercially readily available and exhibit a notably higher effect of improving the charge-discharge characteristics at high current densities as compared to other negative electrode active substances.

By performing the following steps 1 and 2 using any of these raw materials, the carbonaceous particles (A) used in the present invention, which have a broad particle size distribution, can be produced.

Step 1: the step of producing flake graphites of different average particles sizes (d50) through a pulverization treatment and a classification treatment.

Step 2: the step of performing a spheroidization treatment while sequentially and successively adding the flake graphites produced in the step 1, which range from those having a small particle size (e.g., the average particle size (d50) is 5 to 50 μm) to those having a large particle size (e.g., the average particle size (d50) is 51 to 500 μm), to a spheroidization apparatus.

An apparatus used for the pulverization treatment in the step 1 is not particularly restricted, and examples thereof include coarse pulverizers, such as shearing mills, jaw crushers, impact crushers, and cone crushers; intermediate pulverizers, such as roll crushers and hammer mills; and fine pulverizers, such as ball mills, vibration mills, pin mills, stirring mills, and jet mills. A classification treatment is also performed as appropriate to produce flake graphites having different particle sizes.

Then, the flake graphites obtained in the step 1 is subjected to the treatment of the step 2.

For the spheroidization treatment in the step 2, for example, an apparatus that repeatedly applies mechanical actions, e.g., mainly impact force as well as compression, friction, shearing force and the like including particle interactions, to particles can be used. Specifically, it is preferred to use an apparatus which is equipped with a rotor having a large number of blades inside a casing and performs a surface treatment by rotating the rotor at a high speed and thereby applying mechanical actions, such as impact compression, friction and shearing force, to the flake graphites introduced to the inside.

Further, the apparatus preferably has a mechanism for repeatedly applying mechanical actions by circulating the flake graphites. Examples of a preferred apparatus include Hybridization System (manufactured by Nara Machinery Co., Ltd.), KRYPTRON (manufactured by EarthTechnica Co., Ltd.), CF Mill (manufactured by UBE Industries, Ltd.), MECHANO FUSION System (manufactured by Hosokawa Micron Group), and THETA COMPOSTER (manufactured by Tokuju Co., Ltd.). Thereamong, Hybridization System manufactured by Nara Machinery Co., Ltd. is preferred.

By performing the above-described spheroidization step based on a surface treatment, the flake graphites are folded, so that spheroidized graphites having a high circularity are obtained.

When the spheroidization treatment is performed using any of the above-described apparatuses, the peripheral speed of the rotating rotor is set at preferably 30 to 100 m/sec, more preferably 40 to 100 m/sec, still more preferably 50 to 100 m/sec. The treatment can be performed by simply bringing the flake graphites through the apparatus; however, it is preferred to perform the treatment by circulating or retaining the flake graphites in the apparatus for at least 30 seconds, and it is more preferred to perform the treatment by circulating or retaining the flake graphites in the apparatus for 1 minute or longer since this improves the circularity of the resulting spheroidized graphites.

Alternatively, the carbonaceous particles (A) having a broad particle size distribution can be produced by using the above-described spheroidized graphites as a raw material and coating their surfaces at least partially with amorphous carbon or a graphite. Since the spheroidized graphites to be coated have a high circularity, the resulting coated spheroidized graphites also have a high circularity.

In order to coat the spheroidized graphites with amorphous carbon, the spheroidized graphites may be mixed with a petroleum-based or coal-based tar or pitch and a resin such as a polyvinyl alcohol, a polyacrylonitrile, a phenolic resin or cellulose using, as required, a solvent or the like, and the resulting mixture may be calcinated in a non-oxidizing atmosphere at a temperature of usually 600° C. or higher, preferably 800° C. or higher, more preferably 900° C. or higher, still more preferably 1,000° C. or higher, but usually 2,600° C. or lower, preferably 2,200° C. or lower, more preferably 1,800° C. or lower, still more preferably 1,500° C. or lower. After the calcination, pulverization and classification may also be performed as required.

The weight ratio of the spheroidized graphites and the amorphous carbon coating the spheroidized graphites (spheroidized graphites:amorphous carbon) is preferably 1:0.001 or higher, more preferably 1:0.01 or higher, but preferably 1:1 or lower. That is, the weight ratio is preferably in a range of 1:0.001 to 1:1. The coating weight ratio can be determined from the calcination yield by a known method.

By controlling this coating weight ratio to be 1:0.001 or higher, the high Li ion acceptability of amorphous carbon can be adequately utilized, so that favorable rapid charge characteristics can be attained in a lithium ion secondary battery. Meanwhile, by controlling the coating weight ratio to be 1:1 or lower, a reduction in the battery capacity, which is caused by an increase in the effect of the irreversible capacity of amorphous carbon, can be inhibited.

Moreover, in order to coat the spheroidized graphites with a graphite, the spheroidized graphites may be mixed with a petroleum-based or coal-based tar or pitch and a resin such as a polyvinyl alcohol, a polyacrylonitrile, a phenolic resin or cellulose using, as required, a solvent or the like, and the resulting mixture may be calcinated in a non-oxidizing atmosphere at a temperature of usually 2,000° C. or higher, preferably 2,500° C. or higher, but usually 3,200° C. or lower.

By performing the calcination at such a high temperature, the spheroidized graphites are coated with a graphite. It is noted here that, after the calcination, pulverization and classification may also be performed as required.

The weight ratio of the spheroidized graphites and the graphite coating the spheroidized graphites (spheroidized graphites:graphite) is preferably 1:0.001 or higher, more preferably 1:0.01 or higher, but preferably 1:1 or lower. That is, the weight ratio is preferably in a range of 1:0.001 to 1:1. The weight ratio can be determined from the calcination yield by a known method.

It is preferred to control this weight ratio at 1:0.001 or higher since it enables to suppress side reactions with an electrolyte solution and to thereby reduce the irreversible capacity in a lithium ion secondary battery, and it is also preferred to control the weight ratio at 1:1 or lower since this tends to increase the charge-discharge capacity and to provide a high-capacity battery.

<Case where Carbonaceous Particles (A) are Constituted by Mixing Two or More Kinds of Carbonaceous Particles>

The carbonaceous particles (A) used in the present invention can also be constituted by mixing two or more kinds of highly circular carbonaceous particles having different particle sizes and, in this case, by using carbonaceous particles having different particle sizes, a broad particle size distribution can be easily attained as a whole.

Such carbonaceous particles serving as a raw material of the carbonaceous particles (A) used in the present invention (hereinafter, also referred to as "carbonaceous particles X") may be prepared by any method with no problem as long as they have the above-described properties when mixed and, for example, the multi-layered carbon material for electrodes that is described in Japanese Patent No. 3534391 can be used as the carbonaceous particles X.

Alternatively, as the carbonaceous particles X, multi-layered carbonaceous particles 1 obtained by coating the surfaces of spheroidized natural graphite or spheroidized graphitic particles at least partially with amorphous carbon, or multi-layered carbonaceous particles 2 obtained by coating the surfaces of spheroidized graphitic particles at least partially with a graphite can be used, and the carbonaceous particles (A) used in the present invention can be obtained using any two or more kinds of these carbonaceous particles. It is noted here that the term "any two" used above encompasses those cases of using two different kinds of multi-layered carbonaceous particles 1 as well as those cases of using two different kinds of multi-layered carbonaceous particles 2.

(Multi-Layered Carbonaceous Particles 1)

A method of performing a spheroidization treatment of natural graphite or graphitic particles for the production of the above-described spheroidized natural graphite or spheroidized graphitic particles is known and, for example, the spheroidization treatment can be performed by the method described in Japanese Patent No. 3945928. By this spheroidization treatment, particles having a high circularity are obtained, and the multi-layered carbonaceous particles 1 prepared by coating the surfaces of the thus obtained particles at least partially with amorphous carbon also have a high circularity.

The above-described graphitic particles can be produced by, for example, performing a mechanical energy treatment on a naturally-occurring flake, crystalline, plate-like or vein graphite, or an artificial graphite produced by heating petroleum coke, coal pitch coke, coal needle coke, mesophase pitch or the like at 2,500° C. or higher. For the mechanical energy treatment, for example, using an apparatus equipped with a rotor having a large number of blades inside a casing, mechanical actions such as impact compression, friction and shear force are repeatedly applied to the natural graphite or artificial graphite introduced to the inside of the apparatus by rotating the rotor at a high speed.

The multi-layered carbonaceous particles 1 can be obtained by mixing the above-described spheroidized natural graphite or spheroidized graphitic particles with a petroleum-based or coal-based tar or pitch and a resin such as a polyvinyl alcohol, a polyacrylonitrile, a phenolic resin or cellulose using, as required, a solvent or the like, and subsequently calcinating the resulting mixture in a non-oxidizing atmosphere at a temperature of usually 600° C. or higher, preferably 800° C. or higher, more preferably 900° C. or higher, still more preferably 1,000° C. or higher, but usually 2,600° C. or lower, preferably 2,200° C. or lower, more preferably 1,800° C. or lower, still more preferably 1,500° C. or lower. After the calcination, pulverization and classification may also be performed as required.

The weight ratio of the spheroidized natural graphite or spheroidized graphitic particles and the amorphous carbon coating them (spheroidized natural graphite or spheroidized graphitic particles:amorphous carbon) is preferably 1:0.001 or higher, more preferably 1:0.01 or higher, but preferably 1:1 or lower. That is, the weight ratio is preferably in a range of 1:0.001 to 1:1. The coating weight ratio can be determined from the calcination yield by a known method.

By controlling this coating weight ratio to be 1:0.001 or higher, the high Li ion acceptability of amorphous carbon can be adequately utilized, so that favorable rapid charge characteristics can be attained in a lithium ion secondary battery. Meanwhile, by controlling the coating weight ratio to be 1:1 or lower, a reduction in the battery capacity, which is caused by an increase in the effect of the irreversible capacity of amorphous carbon, can be inhibited.

(Multi-Layered Carbonaceous Particles 2)

The multi-layered carbonaceous particles 2 are produced by mixing the above-described spheroidized graphitic particles with a petroleum-based or coal-based tar or pitch and a resin such as a polyvinyl alcohol, a polyacrylonitrile, a phenolic resin or cellulose using, as required, a solvent or the like, and subsequently calcinating the resulting mixture in a non-oxidizing atmosphere at a temperature of usually 2,000° C. or higher, preferably 2,500° C. or higher, but usually 3,200° C. or lower.

By performing the calcination at such a high temperature, the spheroidized graphitic particles are coated with a graphite. Similarly to the multi-layered carbonaceous particles 1, the multi-layered carbonaceous particles 2 also have a high circularity. It is noted here that, after the calcination, pulverization and classification may also be performed as required.

The weight ratio of the spheroidized graphitic particles and the graphite coating them (spheroidized graphitic particles:graphite) is preferably 1:0.001 or higher, more preferably 1:0.01 or higher, but preferably 1:1 or lower. That is, the weight ratio is preferably in a range of 1:0.001 to 1:1. The weight ratio can be determined from the calcination yield by a known method.

It is preferred to control this weight ratio at 1:0.001 or higher since it enables to suppress side reactions with an electrolyte solution and to thereby reduce the irreversible capacity of a lithium ion secondary battery, and it is also preferred to control the weight ratio at 1:1 or lower since this tends to increase the charge-discharge capacity and to provide a high-capacity battery.

(Absolute Value of Difference in d50 between Multi-Layered Carbonaceous Particles 1 and 2)

The multi-layered carbonaceous particles 1 and 2 have different average particle sizes d50, and the absolute value of the difference is preferably 6 μm or larger.

By containing such multi-layered carbonaceous particles 1 and 2 that are different in their particle sizes by at least a certain value and each have a sharp particle size distribution, the carbonaceous particles (A) used in the present invention have a broad particle size distribution as a whole, and a lithium ion secondary battery using the carbonaceous particles (A) can achieve an excellent balance between the cycle characteristics and the discharge load characteristics.

It is noted here that the carbonaceous particles (A) used in the present invention may contain two or more kinds of either the multi-layered carbonaceous particles 1 or the multi-layered carbonaceous particles 2 and that, in the two or more kinds of the multi-layered carbonaceous particles 1 (or 2), the absolute value of the difference in d50 between any two kinds of the multi-layered carbonaceous particles 1 (or 2) may be 6 μm or larger. In the present invention, it is preferred that the carbonaceous particles (A) contain two or more kinds of the multi-layered carbonaceous particles 1.

The carbonaceous particles (A) used in the present invention attains a broad particle size distribution as a whole even when the multi-layered carbonaceous particles 1 and/or 2 each have a broad particle size distribution; however, by allowing the multi-layered carbonaceous particles 1 and/or 2 to each have a sharp particle size distribution and a higher circularity as described above, the circularity can be uniformly improved in the respective ranges of the broad particle size distribution, so that inclusion of a particle size distribution range having a low circularity can be prevented.

(d50 of Multi-Layered Carbonaceous Particles 1 and 2)

The multi-layered carbonaceous particles 1 and 2 have an average particle size (d50) in a range of preferably 2 to 30 μm, more preferably 4 to 20 μm, still more preferably 6 to 15 μm.

By controlling the d50 to be 2 μm or larger, an increase in the irreversible capacity due to an increase in the specific surface area of the carbonaceous particles (A) used in the present invention can be inhibited. Further, by controlling the d50 to be 30 μm or smaller, in a lithium ion secondary battery, deterioration of the rapid charge-discharge characteristics, which is caused by a decrease in the contact area between an electrolyte solution and the carbonaceous particles (A) used in the present invention, can be inhibited.
(Circularity of Multi-Layered Carbonaceous Particles 1 and 2)

The multi-layered carbonaceous particles 1 and 2 have a circularity of preferably 0.88 or higher as determined by a flow-type particle image analysis. Carbonaceous particles whose circularity is at a certain level or higher in this manner yield a lithium ion secondary battery having excellent high-current-density charge-discharge characteristics.

A method of improving the circularity is not particularly restricted; however, a method of performing a spheroidization treatment to make the particle spherical is preferred since voids between the resulting particles have a uniform shape when an electrode is produced using the particles. Examples of a spheroidization method include a method in which a shearing force or a compressive force is applied so as to mechanically make the shape of particles close to being spherical, and a mechanical/physical treatment method in which plural fine particles are granulated by means of the adhesive force of a binder or the fine particles themselves.

The circularity is more preferably 0.9 or higher, particularly preferably 0.92 or higher, but usually 1 or lower, preferably 0.98 or lower, more preferably 0.95 or lower. An excessively low circularity tends to result in deterioration of the high-current-density charge-discharge characteristics of a lithium ion secondary battery obtained using the carbonaceous particles (A) of the present invention. Meanwhile, an excessively high circularity makes the carbonaceous particles true-spherical; therefore, the contact area between the carbonaceous particles is reduced, and the cycle characteristics of the battery may be deteriorated.
(Interplanar Spacing (d002) of (002) Planes, and Crystallite Size (Lc) in Multi-Layered Carbonaceous Particles 1 and 2)

In the multi-layered carbonaceous particles 1 and 2, the value of the interplanar spacing d (interlayer distance (d002)) of lattice planes ((002) planes), which is determined by X-ray wide-angle diffractometry in accordance with the method of the Japan Society for the Promotion of Science, is preferably 0.338 nm or smaller, more preferably 0.337 nm or smaller. An excessively large d002 value indicates that the crystallinity of the carbonaceous particles is low, and this may lead to an increase in the initial irreversible capacity of a lithium ion secondary battery. Meanwhile, the interplanar spacing of the (002) planes of the carbonaceous particles is usually 0.335 nm or larger since the theoretical value thereof is 0.335 nm. A method of measuring the (d002) is as described above.

Further, in the multi-layered carbonaceous particles 1 and 2, the crystallite size (Lc), which is determined by X-ray wide-angle diffractometry in accordance with the method of the Japan Society for the Promotion of Science, is in a range of usually 1.5 nm or larger, preferably 3.0 nm or larger. When the crystallite size (Lc) is smaller than this range, the particles have a low crystallinity, and this may lead to a reduction in the battery reversible capacity. The above-described lower limit is the theoretical value for graphites. A method of measuring the (Lc) is as described above.
(Raman R Values of Multi-Layered Carbonaceous Particles 1 and 2)

The Raman R value of the multi-layered carbonaceous particles 1 is usually 0.10 or larger, preferably 0.15 or larger, more preferably 0.20 or larger, still more preferably 0.25 or larger, but usually 1.00 or smaller, preferably 0.70 or smaller, more preferably 0.40 or smaller, still more preferably 0.35 or smaller.

Further, the Raman R value of the multi-layered carbonaceous particles 2 is usually 0.01 or larger, preferably 0.05 or larger, more preferably 0.07 or larger, still more preferably 0.10 or larger, but usually 0.70 or smaller, preferably 0.40 or smaller, more preferably 0.35 or smaller, still more preferably 0.30 or smaller.

An excessively small Raman R value means that the particle surfaces are not sufficiently damaged in the mechanical energy treatment of graphitic particles or the like in the production process of the carbonaceous particles (A) used in the present invention. Accordingly, in such carbonaceous particles, the amount of sites for receiving and releasing Li ions, such as fine cracks, breaks and structural defects that are generated by damage on the surfaces of the graphitic particles or the like, is small; therefore, the rapid charge-discharge characteristics for lithium ions may be deteriorated in a lithium ion secondary battery.

Meanwhile, a large Raman R value indicates that the amount of amorphous carbon coating the graphitic particles or the like is large and/or the amount of fine cracks, breaks and structural defects on the surfaces of the graphitic particles or the like is overly large due to excessive mechanical energy treatment. When the Raman R value is excessively large, an increase in the effect of the irreversible capacity of amorphous carbon and an increase in side reactions with an electrolyte solution cause a reduction in the initial charge-discharge efficiency and an increase in the gas generation, and the battery capacity thereby tends to be reduced.

A method of measuring the Raman R value is as described above.
(Tap Density of Multi-Layered Carbonaceous Particles 1 and 2)

The multi-layered carbonaceous particles 1 and 2 have a tap density of usually 0.50 $g/cm^3$ or higher, preferably 0.75 $g/cm^3$ or higher, more preferably 0.85 $g/cm^3$ or higher, still more preferably 0.90 $g/cm^3$ or higher, but usually 1.40 $g/cm^3$ or lower, preferably 1.35 $g/cm^3$ or lower, more preferably 1.20 $g/cm^3$ or lower, still more preferably 1.10 $g/cm^3$ or lower. A method of measuring the tap density is as described below.

An excessively low tap density makes it difficult to increase the packing density of the carbonaceous particles (A) used in the present invention when the carbonaceous particles (A) are used as a negative electrode, and this tends to make it difficult to obtain a high-capacity battery. Meanwhile, when the tap density is excessively high, since the amount of voids between the particles in the electrode is excessively small, the conductivity between the particles is unlikely to be ensured, and this tends to make it difficult to attain preferable battery characteristics.
(Specific Surface Area of Multi-Layered Carbonaceous Particles 1 and 2 based on BET Method)

The multi-layered carbonaceous particles 1 and 2 have a specific surface area, which is determined by a BET method, of usually 0.5 $m^2/g$ or larger, preferably 2 $m^2/g$ or larger, more preferably 3 $m^2/g$ or larger, still more preferably 4 $m^2/g$ or larger, particularly preferably 5 $m^2/g$ or larger, but usually 11 $m^2/g$ or smaller, preferably 9 $m^2/g$ or smaller, more preferably 8 $m^2/g$ or smaller, still more preferably 7 $m^2/g$ or smaller, particularly preferably 6.5 $m^2/g$ or smaller. When the specific surface area is smaller than this range, since the amount of sites for entry and exit of Li is small, the rapid charge-discharge characteristics, output characteristics and low-temperature input-output characteristics of a lithium ion secondary battery are deteriorated, whereas when the specific surface area is larger than this range, since the activity of active substance with an electrolyte solution is excessively high, an increase in side reactions with the electrolyte solution causes a reduction in the initial charge-discharge efficiency and an increase in the gas generation, and the battery capacity tends to be reduced as a result. The specific surface area based on a BET method is measured by the method described below in the section of Examples.

(Amount of Multi-Layered Carbonaceous Particles 1 and 2 to be Incorporated)

In the carbonaceous particles (A) used in the present invention, the above-described multi-layered carbonaceous particles 1 and 2 are incorporated usually in a total amount of 50% by weight to 100% by weight with respect to the whole carbonaceous particles (A) (100% by weight). The carbonaceous particles (A) used in the present invention may be constituted only by the multi-layered carbonaceous particles 1 and 2; however, for example, the multi-layered carbon material for electrodes that is described in Japanese Patent No. 3534391 may also be used as a constituent of the carbonaceous particles (A) used in the present invention. It is noted here that, as described above, the carbonaceous particles (A) used in the present invention may be constituted by two or more different kinds of the multi-layered carbonaceous particles 1, or two or more different kinds of the multi-layered carbonaceous particles 2.

(Production of Carbonaceous Particles (A) Used in Present Invention)

The carbonaceous particles (A) used in the present invention, which have a broad particle size distribution, can be produced by mixing various carbonaceous particles X prepared to have different particle sizes, such as the above-described multi-layered carbonaceous particles 1 and 2. The carbonaceous particles X are constituent materials each having a high circularity; therefore, the carbonaceous particles (A) used in the present invention also have a high circularity, which is usually 0.88 or higher, as a whole. A method of mixing the carbonaceous particles X is not particularly restricted, and any known method can be employed.

[Method of Producing Silicon Oxide Particles (B)]

The term "silicon oxide particles (B) used in the present invention" used herein is a general term for particles composed of a silicon oxide represented by SiOx (wherein, 0<x<2) that are usually obtained by using silicon dioxide ($SiO_2$) as a raw material and thermally reducing this $SiO_2$ with metallic silicon (Si) and/or carbon (it is noted here that an element other than silicon and carbon can be doped as described below and, in this case, the resulting particles have a composition formula different from SiOx; however, such particles are also encompassed by the term "silicon oxide particles (B) used in the present invention"). Silicon (Si) has a higher theoretical capacity than graphites, and alkali ions such as lithium ions can easily enter or exit amorphous silicon oxide, so that a high capacity can be attained. As described above, in the silicon oxide particles (B) used in the present invention, the ratio ($MaM_{Si}$) of the number of oxygen atoms ($M_O$) with respect to the number of silicon atoms ($M_{Si}$) is preferably 0.5 to 1.6.

The silicon oxide particles (B) used in the present invention may be composite-type silicon oxide particles each having a carbon layer composed of amorphous carbon at least partially on the surface of a silicon oxide particle serving as a nucleus. As the silicon oxide particles (B), one selected from the group consisting of silicon oxide particles (B1) having no such carbon layer composed of amorphous carbon and composite-type silicon oxide particles (B2) may be used singly, or two or more thereof may be used in combination. The phrase "having a carbon layer composed of amorphous carbon at least partially on the surface" used herein encompasses not only a mode in which the carbon layer covers a part or the entirety of the surface of a silicon oxide particle in the form of a layer, but also a mode in which the carbon layer is adhered or impregnated to a part or the entirety of the surface. The carbon layer may be provided in such a manner to cover the entirety of the surface, or only a part of the surface may be covered or adhered/impregnated with the carbon layer.

<Method of Producing Silicon Oxide Particles (B1)>

The silicon oxide particles (B1) are not particularly restricted in terms of the production method thereof as long as they satisfy the characteristics of the present invention and, for example, silicon oxide particles produced by the method described in Japanese Patent No. 3952118 can be used. Specifically, a silicon dioxide powder and a metallic silicon powder or carbon powder are mixed at a specific ratio and, after loading the thus obtained mixture to a reactor, the mixture is heated to and maintained at a temperature of 1,000° C. or higher under normal pressure or a specific reduced pressure and thereby allowed to generate a SiOx gas, and the thus generated SiOx gas is subsequently cooled to precipitate, whereby silicon oxide particles represented by a general formula SiOx (wherein, 0.5≤x≤1.6) can be obtained. The particles can be produced by performing a mechanical energy treatment on the thus obtained precipitates.

The mechanical energy treatment is performed by, for example, a method in which, using a device such as a ball mill, a vibrating ball mill, a planetary ball mill or a rolling ball mill, a raw material and a moving body that does not react with the raw material are loaded to a reaction vessel, and vibration, rotation or a combination of these movements is applied thereto. As a result, the silicon oxide particles (B) satisfying the above-described properties can be formed.

<Method of Producing Composite-Type Silicon Oxide Particles (B2)>

A method of producing the composite-type silicon oxide particles (B2) each having a carbon layer composed of amorphous carbon at least partially on the surface of a silicon oxide particle is not particularly restricted. The composite-type silicon oxide particles (B2) each having a carbon layer composed of amorphous carbon at least partially on the surface of a silicon oxide particle can be produced by mixing the silicon oxide particles (B1) with a petroleum-based or coal-based tar or pitch and a resin such as a polyvinyl alcohol, a polyacrylonitrile, a phenolic resin or cellulose using, as required, a solvent or the like, and subsequently calcinating the resulting mixture in a non-oxidizing atmosphere at a temperature of 500° C. to 3,000° C., preferably 700° C. to 2,000° C., more preferably 800 to 1,500° C.

<Disproportionation Treatment>

The silicon oxide particles (B) used in the present invention may be the silicon oxide particles (B1) or composite-type silicon oxide particles (B2) that are produced in the above-described manner and further subjected to a heat treatment and a disproportionation treatment. By performing a disproportionation treatment, a structure in which zero-valent silicon atoms are unevenly distributed as Si microcrystals in amorphous SiOx is formed and, as described above in the section of [Mechanism] relating to the negative electrode material of the present invention, because of the Si microcrystals in amorphous SiOx, the range of potential in which the silicon oxide particles receive and release Li ions is made close to that of carbonaceous particles, and a change in volume associated with reception and release of Li ions thus takes place simultaneously with that of the carbonaceous particles (A); therefore, the relative positional relationship between the carbonaceous particles (A) and the silicon oxide particles (B) at their interfaces is maintained, so that deterioration of performance caused by the loss of contact with the carbonaceous particles (A) can be suppressed.

This disproportionation treatment can be performed by heating the silicon oxide particles (B1) or the composite-type silicon oxide particles (B2) under an inert gas atmosphere in a temperature range of 900 to 1,400° C.

When the heating temperature in the disproportionation treatment is lower than 900° C., disproportionation does not proceed at all or it requires an extremely long time for the formation of silicon fine cells (silicon microcrystals), which is not efficient. On the other hand, when the heating temperature is higher than 1,400° C., since structuring of silicon dioxide moieties proceeds and the movement of Li ions is thereby inhibited, the functions of a lithium ion secondary battery may be deteriorated. The heating temperature in the disproportionation treatment is preferably 1,000 to 1,300° C., more preferably 1,100 to 1,250° C. The duration of the treatment (disproportionation time) can be controlled as appropriate in a range of 10 minutes to 20 hours, particularly about 30 minutes to 12 hours, in accordance with the disproportionation treatment temperature, and, for example, it is preferred to perform the treatment for 5 hours when the treatment temperature is 1,100° C.

For the disproportionation treatment, a reaction apparatus having a heating mechanism can be used in an inert gas atmosphere, and the reaction apparatus is not particularly restricted. The treatment can be performed in a continuous or batchwise manner and, specifically, a fluidized bed reactor, a rotary furnace, a vertical moving bed reactor, a tunnel furnace, a batch furnace, a rotary kiln or the like can be selected as appropriate in accordance with the intended purpose. In this case, as a (treatment) gas, a gas that is inert at the above-described treatment temperature, such as Ar, He, $H_2$ or $N_2$, can be used singly, or a mixed gas thereof can be used.

<Production of Carbon-Coated/Silicon Microcrystal-Dispersed Silicon Oxide Particles>

The silicon oxide particles (B) used in the present invention may also be composite-type silicon oxide particles obtained by coating the surfaces of silicon microcrystal-containing silicon oxide particles with carbon.

A method of producing such composite-type silicon oxide particles is not particularly restricted; however, for example, any of the following methods I to III can be preferably employed.

I: a method in which silicon oxide powder represented by a general formula SiOx ($0.5 \leq x < 1.6$) is used as a raw material, and this raw material is heat-treated under an atmosphere containing at least an organic gas and/or steam in a temperature range of 900 to 1,400° C., preferably 1,000 to 1,400° C., more preferably 1,050 to 1,300° C., still more preferably 1,100 to 1,200° C., so as not only to disproportionate the raw material silicon oxide powder into a composite of silicon and silicon dioxide but also to perform chemical vapor deposition on the surface thereof.

II: a method in which, for example, a silicon composite obtained by disproportionating silicon oxide powder represented by a general formula SiOx ($0.5 \leq x < 1.6$) in advance through a heat treatment performed under an inert gas atmosphere at a temperature of 900 to 1,400° C., preferably 1,000 to 1,400° C., more preferably 1,100 to 1,300° C., a composite obtained by coating silicon fine particles with silicon dioxide in accordance with a sol-gel method, a composite obtained by sintering silicon fine powder that has been coagulated with fine powder silica such as fumed silica or precipitated silica via water, or silicon and a partial oxide or nitride thereof, which have been pulverized to a particle size of preferably 0.1 to 50 μm and heated in an inert gas flow at 800 to 1,400° C. in advance, is used as a raw material, and this raw material is heat-treated under an atmosphere containing at least an organic gas and/or steam in a temperature range of 800 to 1,400° C., preferably 900 to 1,300° C., more preferably 1,000 to 1,200° C., so as to perform chemical vapor deposition on the surface.

III: a method in which silicon oxide powder represented by a general formula SiOx ($0.5 \leq x < 1.6$), which has been subjected to a chemical vapor deposition treatment in advance with an organic gas and/or steam in a temperature range of 500 to 1,200° C., preferably 500 to 1,000° C., more preferably 500 to 900° C., is used as a raw material, and this raw material is disproportionated through a heat treatment performed under an inert gas atmosphere in a temperature range of 900 to 1,400° C., preferably 1,000 to 1,400° C., more preferably 1,100 to 1,300° C.

In the chemical vapor deposition treatment (i.e., thermal CVD treatment) performed in a temperature range of 800 to 1,400° C. (preferably 900 to 1,400° C., particularly 1,000 to 1,400° C.) in the above-described method I or II, when the heat treatment temperature is lower than 800° C., fusion of the resulting conductive carbon coating film and silicon composite as well as alignment of carbon atoms (crystallization) are insufficient, whereas when the heat treatment temperature is higher than 1,400° C., since structuring of silicon dioxide moieties proceeds and the movement of lithium ions is thereby inhibited, the functions of a lithium ion secondary battery may be deteriorated.

Meanwhile, as for the disproportionation of silicon oxide in the above-described method I or III, when the heat treatment temperature is lower than 900° C., the disproportionation does not proceed at all or it requires an extremely long time for the formation of silicon fine cells (silicon microcrystals), which is not efficient. On the other hand, when the heat treatment temperature is higher than 1,400° C., since structuring of silicon dioxide moieties proceeds and the movement of lithium ions is thereby inhibited, the functions of a lithium ion secondary battery may be deteriorated.

In the method III, disproportionation of silicon oxide is performed at 900 to 1,400° C., particularly 1,000 to 1,400° C., after a chemical vapor deposition (CVD) treatment; therefore, even when the temperature of the CVD treatment is in a range of lower than 800° C., a product in which a conductive carbon coating film of aligned (crystallized) carbon atoms and a silicon composite are fused together on the surface can be obtained eventually.

In this manner, a carbon film is preferably formed by performing a thermal CVD (chemical vapor deposition at 800° C. or higher), and the duration of the thermal CVD is set as appropriate based on the relation with the amount of carbon. This treatment may cause aggregation of the particles; however, the resulting aggregates are crushed using a ball mill or the like. Depending on the case, thermal CVD is performed again in the same manner.

In the method I, when a silicon oxide represented by a general formula SiOx ($0.5 \leq x < 1.6$) is used as a raw material, it is important to allow a disproportionation reaction to take place simultaneously with the chemical vapor deposition treatment and to thereby finely disperse silicon having a crystal structure in silicon dioxide and, in this case, it is necessary to appropriately select the treatment temperature, the treatment time, the type of the raw material generating an organic gas, and the organic gas concentration for allowing the chemical vapor deposition and the disproportionation to proceed. The heat treatment time ((CVD/disproportionation) time) is selected to be in a range of usually 0.5 to 12 hours, preferably 1 to 8 hours, particularly 2 to 6 hours. This heat treatment time is also related with the heat treatment temperature ((CVD/disproportionation) temperature) and, for example, it is preferred to perform the treatment for at least 5 hours when the treatment temperature is 1,000° C.

Further, in the method II, when the heat treatment is performed under an atmosphere containing an organic gas and/or steam, the duration of this heat treatment (CVD treatment time) can be in a range of usually 0.5 to 12 hours, particularly 1 to 6 hours. When a silicon oxide represented by SiOx is disproportionated in advance, the duration of this heat treatment (disproportionation time) can be usually 0.5 to 6 hours, particularly 0.5 to 3 hours.

Moreover, in the method III, the duration of treating the SiOx by chemical vapor deposition in advance (CVD treatment time) can be usually 0.5 to 12 hours, particularly 1 to 6 hours, and the duration of the heat treatment under an inert gas atmosphere (disproportionation time) can be usually 0.5 to 6 hours, particularly 0.5 to 3 hours.

As an organic material used as a raw material generating an organic gas, one that can be thermally decomposed at the above-described heat treatment temperature particularly under a non-oxidizing atmosphere to produce carbon (graphite) is selected, and examples of such an organic material include aliphatic or alicyclic hydrocarbons, such as methane, ethane, ethylene, acetylene, propane, butane, butene, pentane, isobutane and hexane, and mixtures thereof; and monocyclic to tricyclic aromatic hydrocarbons, such as benzene, toluene, xylene, styrene, ethylbenzene, diphenylmethane, naphthalene, phenol, cresol, nitrobenzene, chlorobenzene, indene, coumarone, pyridine, anthracene and phenanthrene, and mixtures thereof. In addition, gas light oils, creosote oils, anthracene oils, and naphtha-cracked tar oils, which are obtained by tar distillation process, may be used singly or as a mixture.

For the above-described thermal CVD (thermal chemical vapor deposition) treatment and/or disproportionation treatment, a reaction apparatus having a heating mechanism can be used in a non-oxidizing atmosphere, and the reaction apparatus is not particularly restricted. The treatment(s) can be performed in a continuous or batchwise manner and, specifically, a fluidized bed reactor, a rotary furnace, a vertical moving bed reactor, a tunnel furnace, a batch furnace, a rotary kiln or the like can be selected as appropriate in accordance with the intended purpose. In this case, as a (treatment) gas, any one of the above-described organic gasses, or a mixed gas of an organic gas and a non-oxidizing gas, such as Ar, He, $H_2$ or $N_2$, can be used.

In this case, a reaction apparatus having a structure in which a furnace core tube is arranged horizontally and rotates, such as a rotary furnace or a rotary kiln, is preferred and, by using such a reaction apparatus to perform the chemical vapor deposition treatment while rolling the silicon oxide particles, the production can be stably carried out without causing aggregation of the silicon oxide particles. The rotation speed of the furnace core tube is preferably 0.5 to 30 rμm, particularly 1 to 10 rμm. It is noted here that this reaction apparatus is not particularly restricted as long as it has a furnace core tube capable of retaining an atmosphere, a rotating mechanism which rotates the furnace core tube, and a heating mechanism capable of increasing and maintaining the temperature. Depending on the intended purpose, the reaction apparatus may be equipped with a raw material supplying mechanism (e.g., a feeder) and/or a product retrieval mechanism (e.g., a hopper), and the furnace core tube may be inclined or provided with a baffle plate therein for controlling the raw material retention time. The material of the furnace core tube is also not particularly restricted and may be selected as appropriate from ceramics, such as silicon carbide, alumina, mullite and silicon nitride, high-melting-point metals such as molybdenum and tungsten, SUS, and quartz in accordance with the conditions and purpose of the treatment.

Further, by controlling the ratio ($u/u_{mf}$) of the fluidizing gas linear velocity u (m/sec) and the fluidization starting velocity $u_{mf}$ to be in a range of $1.5 \leq u/u_{mf} \leq 5$, a conductive coating film can be formed more efficiently. When the value of $u/u_{mf}$ is smaller than 1.5, the fluidization may be insufficient, causing variations in the resulting conductive coating film, whereas when the value of $u/u_{mf}$ is larger than 5, secondary aggregation of the particles may occur and hinder the formation of a uniform conductive coating film. It is noted here that the fluidization starting velocity varies depending on the size of the particles, the treatment temperature, the treatment atmosphere and the like, and can be defined as the fluidizing gas linear velocity of when the fluidizing gas (linear velocity) is gradually increased and the powder pressure loss in this process has reached W (powder weight)/A (cross-sectional area of fluidized bed). The $u_{mf}$ can be generally in a range of 0.1 to 30 cm/sec, preferably about 0.5 to 10 cm/sec, and the particle size providing such a value of $u_{mf}$ can be generally 0.5 to 100 μm, preferably 5 to 50 μm. A particle size of smaller than 0.5 μm may cause secondary aggregation, preventing the surface of each particle from being effectively treated.

<Doping of Other Element to Silicon Oxide Particles (B)>

The silicon oxide particles (B) may be doped with an element other than silicon and oxygen. The silicon oxide particles (B) doped with an element other than silicon and oxygen have a stabilized chemical structure inside the particles and are thus expected to improve the initial charge-discharge efficiency and the cycle characteristics. In addition, since the lithium ion acceptability is improved in such silicon oxide particles (B) and made close to that of the carbonaceous particles (A), the use of a negative electrode material containing a combination of these carbonaceous particles (A) and silicon oxide particles (B) enables to produce a battery in which, even during rapid charging, excessive concentration of lithium ions does not occur in the negative electrode and metallic lithium is thus unlikely to precipitate.

As the element to be doped, any element that does not belong to Group 18 of the periodic table can be selected; however, in order to make the silicon oxide particles (B) doped with an element other than silicon and oxygen more stable, an element belonging to the first four periods of the periodic table is preferred. Specifically, the element to be doped can be selected from those elements belonging to the first four periods of the periodic table, such as alkali metals, alkaline earth metals, Al, Ga, Ge, N, P, As, and Se. In order to improve the lithium ion acceptability of the silicon oxide particles (B) doped with an element other than silicon and oxygen, the element to be doped is preferably an alkali metal or alkaline earth metal that belongs to the first four periods of the periodic table, more preferably Mg, Ca or Li, still more preferably Li. These elements may be used singly, or in combination of two or more thereof.

In the silicon oxide particles (B) doped with an element other than silicon and oxygen, the ratio ($M_D/M_{Si}$) of the number of atoms of the doped element ($M_D$) with respect to the number of silicon atoms ($M_{Si}$) is preferably 0.01 to 5, more preferably 0.05 to 4, still more preferably 0.1 to 3. When the ratio $M_D/M_{Si}$ is lower than this range, the effect of doping the element other than silicon and oxygen cannot be attained, whereas when the ratio $M_D/M_{Si}$ is higher than this range, the element other than silicon and oxygen that is not consumed in the doping reaction may remain on the surfaces of the silicon oxide particles to cause a reduction in the capacity of the silicon oxide particles.

Examples of a method of producing the silicon oxide particles (B) doped with an element other than silicon and oxygen include a method in which silicon oxide particles are mixed with the element to be doped itself or a powder of a compound containing the element, and the resulting mixture is subsequently heated at a temperature of 50 to 1,200° C. under an inert gas atmosphere. Examples of the method also include a method in which a silicon dioxide powder is mixed with a metallic silicon powder or carbon powder at a specific ratio, the element to be doped itself or a powder of a compound containing the element is added thereto and, after loading the thus obtained mixture to a reactor, the mixture is heated to and maintained at a temperature of 1,000° C. or higher under normal pressure or a specific reduced pressure and thereby allowed to generate a gas, and the thus generated gas is cooled and precipitated to obtain silicon oxide particles doped with an element other than silicon and oxygen.

[Negative Electrode for Nonaqueous Secondary Batteries]

The negative electrode for nonaqueous secondary batteries according to the present invention (hereinafter, may be referred to as "the negative electrode of the present invention") includes a current collector and an active substance layer formed on the current collector, and the active substance layer contains the negative electrode material of the present invention.

For the production of the negative electrode using the negative electrode material of the present invention, the negative electrode material blended with a binder resin may be made into a slurry with an aqueous or organic medium and, after adding a thickening agent thereto as required, the slurry may be coated and dried on a current collector.

As the binder resin, it is preferred to use a resin that is stable to nonaqueous electrolyte solutions and insoluble in water. Examples of such a binder resin that can be used include rubbery polymers, such as styrene-butadiene rubbers, isoprene rubbers, and ethylene-propylene rubbers; synthetic resins, such as polyethylene, polypropylene, polyethylene terephthalate, polyimide, polyacrylic acid, and aromatic polyamide; thermoplastic elastomers, such as styrene-butadiene-styrene block copolymers and hydrogenation products thereof, styrene-ethylene-butadiene-styrene copolymers, styrene-isoprene-styrene block copolymers, and hydrogenation products thereof; flexible resinous polymers, such as syndiotactic 1,2-polybutadiene, ethylene-vinyl acetate copolymers, and copolymers of ethylene and an α-olefin having 3 to 12 carbon atoms; and fluorinated polymers, such as polytetrafluoroethylene-ethylene copolymers, polyvinylidene fluoride, polypentafluoropropylene, and polyhexafluoropropylene. As the organic medium, for example, N-methylpyrrolidone or dimethylformamide can be used.

The binder resin is preferably used in an amount of usually not less than 0.1 parts by weight, preferably not less than 0.2 parts by weight, with respect to 100 parts by weight of the negative electrode material. By using the binder resin in an amount of 0.1 parts by weight or greater with respect to 100 parts by weight of the negative electrode material, a sufficient binding strength is attained between the negative electrode constituting materials such as the active substance layer and between the negative electrode constituting materials and the current collector, so that a reduction in the battery capacity and deterioration of the cycle characteristics, which are caused by detachment of the negative electrode constituting materials from the negative electrode, can be inhibited.

Further, the amount of the binder resin to be used is preferably not greater than 10 parts by weight, more preferably not greater than 7 parts by weight, with respect to 100 parts by weight of the negative electrode material. By using the binder resin in an amount of 10 parts by weight or less with respect to 100 parts by weight of the negative electrode material, not only a reduction in the capacity of the negative electrode can be inhibited but also problems such as movement of alkali ions (e.g., lithium ions) in and out of the negative electrode material can be avoided.

Examples of the thickening agent added to the slurry include water-soluble celluloses, such as carboxymethyl cellulose, methyl cellulose, hydroxyethyl cellulose, and hydroxypropyl cellulose; polyvinyl alcohols; and polyethylene glycols. Thereamong, carboxymethyl cellulose is preferred. The thickening agent is used in an amount of usually 0.1 to 10 parts by weight, particularly preferably 0.2 to 7 parts by weight, with respect to 100 parts by weight of the negative electrode material.

As the current collector of the negative electrode, for example, any of copper, a copper alloy, stainless steel, nickel, titanium and carbon that are conventionally known to be usable for this application may be used. The shape of the current collector is usually a sheet shape, and it is also preferred to use a current collector having irregularities on the surface, a net, a punched metal or the like.

After the slurry composed of the negative electrode material and the binder resin is coated and dried on the current collector, it is preferred that the resultant is pressed so as to increase the density of the active substance layer formed on the current collector and to thereby increase the battery capacity per unit volume of the active substance layer of the negative electrode. The density of the active substance layer is in a range of preferably 1.2 to 1.8 g/cm$^3$, more preferably 1.3 to 1.6 g/cm$^3$.

By controlling the density of the active substance layer to be 1.2 g/cm$^3$ or higher, a reduction in the battery capacity due to an increase in the electrode thickness can be inhibited. In addition, by controlling the density of the active substance layer to be 1.8 g/cm$^3$ or lower, the amount of an electrolyte solution retained in voids is reduced in association with a decrease in voids between the particles inside the electrode, so that the mobility of alkali ions such as lithium ions is reduced and deterioration of the rapid charge-discharge characteristics can thereby be prevented.

The active substance layer of the negative electrode is preferably configured such that the silicon oxide particles (B) exist in gaps formed by the carbonaceous particles (A). By the presence of the silicon oxide particles (B) in the gaps formed by the carbonaceous particles (A), the capacity can be increased and the rate characteristics can be improved.

In the negative electrode material of the present invention, the volume of pores having a size in a range of 10 nm to 100,000 nm, which is determined by a mercury intrusion method, is preferably 0.05 ml/g or greater, more preferably 0.1 ml/g or greater. By controlling the volume of such pores to be 0.05 ml/g or greater, the area for entry and exit of alkali ions such as lithium ions is increased.

[Nonaqueous Secondary Battery]

The nonaqueous secondary battery of the present invention is a nonaqueous secondary battery including a positive electrode, a negative electrode and an electrolyte, in which the negative electrode of the present invention is used as the negative electrode.

The nonaqueous secondary battery of the present invention can be produced in accordance with a conventional method, except that the above-described negative electrode of the present invention is used.

[Positive Electrode]

In the nonaqueous secondary battery of the present invention, examples of a positive electrode material that may be used as an active substance of the positive electrode include lithium-transition metal composite oxides, such as lithium-cobalt composite oxide having a basic composition represented by $LiCoO_2$, lithium-nickel composite oxide represented by $LiNiO_2$, and lithium-manganese composite oxide represented by $LiMnO_2$ or $LiMn_2O_4$; transition metal oxides, such as manganese dioxide; and mixtures of these composite oxides. Further, $TiS_2$, $FeS_2$, $Nb_3S_4$, $Mo_3S_4$, $CoS_2$, $V_2O_5$, $CrO_3$, $V_3O_3$, $FeO_2$, $GeO_2$, $LiNiO_{0.33}Mn_{0.33}Co_{0.33}O_2$, $LiFePO_4$ and the like may be used as well.

The positive electrode can be produced by making the above-described positive electrode material blended with a binder resin into a slurry with an appropriate solvent and subsequently coating and drying this slurry on a current collector. It is preferred to incorporate a conductive material, such as acetylene black or Ketjen black, into the slurry. Further, a thickening agent may also be incorporated as desired.

As the thickening agent and the binder resin, ones that are well-known for this application, for example, those exemplified above for use in the production of the negative electrode, may be used. With respect to 100 parts by weight of the positive electrode material, the blending ratio of the conductive material is preferably 0.5 to 20 parts by weight, particularly preferably 1 to 15 parts by weight, and the blending ratio of the thickening agent is preferably 0.2 to 10 parts by weight, particularly preferably 0.5 to 7 parts by weight.

With respect to 100 parts by weight of the positive electrode material, the blending ratio of the binder resin in the case of preparing a slurry of the binder resin with water is preferably 0.2 to 10 parts by weight, particularly preferably 0.5 to 7 parts by weight, and the blending ratio of the binder resin in the case of preparing a slurry of the binder resin with an organic solvent capable of dissolving the binder resin, such as N-methylpyrrolidone, is 0.5 to 20 parts by weight, particularly preferably 1 to 15 parts by weight.

Examples of the current collector of the positive electrode include aluminum, titanium, zirconium, hafnium, niobium, tantalum, and alloys thereof. Thereamong, aluminum, titanium, tantalum and alloys thereof are preferred, and aluminum and alloys thereof are most preferred.

[Electrolyte]

The electrolyte used in the nonaqueous secondary battery of the present invention may be an all-solid electrolyte or an electrolyte solution containing an electrolyte in a nonaqueous solvent; however, it is preferably an electrolyte solution containing an electrolyte in a nonaqueous solvent.

As the electrolyte solution, any conventionally well-known electrolyte solution obtained by dissolving various lithium salts in a nonaqueous solvent can be used. Examples of a nonaqueous solvent that can be used include cyclic carbonates, such as ethylene carbonate, fluoroethylene carbonate, propylene carbonate, butylene carbonate, and vinylene carbonate; chain carbonates, such as dimethyl carbonate, ethyl methyl carbonate, and diethyl carbonate; chain carboxylic acid esters, such as methyl acetate, methyl propionate, ethyl propionate, ethyl acetate, and n-propyl acetate; cyclic esters, such as γ-butyrolactone; cyclic ethers, such as crown ethers, 2-methyltetrahydrofuran, tetrahydrofuran, 1,2-dimethyltetrahydrofuran, and 1,3-dioxolane; and chain ethers, such as 1,2-dimethoxyethane. Usually, two or more of these nonaqueous solvents are used in combination. Among these nonaqueous solvents, it is preferred to use a cyclic carbonate, a chain carbonate, a chain carboxylic acid ester, or a mixture obtained by further adding other solvent thereto. As the cyclic carbonate, ethylene carbonate or fluoroethylene carbonate is preferred from the standpoint of improving the cycle characteristics. As the chain carbonate, dimethyl carbonate or ethyl methyl carbonate is preferred from the standpoint of reducing the viscosity of the electrolyte solution. As the chain carboxylic acid ester, methyl acetate or methyl propionate is preferred from the standpoint of reducing the viscosity of the electrolyte solution as well as from the standpoint of the cycle characteristics.

Examples of an electrolyte to be dissolved in the nonaqueous solvent include $LiC_1O_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. In the electrolyte solution, the concentration of the electrolyte is usually 0.5 to 2 mol/L, preferably 0.6 to 1.5 mol/L.

To the electrolyte solution, for example, a compound such as vinylene carbonate, vinyl ethylene carbonate, fluoroethylene carbonate, methyl phenyl carbonate, succinic anhydride, maleic anhydride, propane sulfone or diethyl sulfone, and/or a difluorophosphate such as lithium difluorophosphate may also be added. Further, an overcharge inhibitor such as diphenyl ether or cyclohexylbenzene may be added as well. Among these compounds, from the standpoint of the charge-discharge efficiency, preferably at least one selected from vinylene carbonate, vinyl ethylene carbonate, fluoroethylene carbonate, methyl phenyl carbonate and lithium difluorophosphate, particularly preferably lithium difluorophosphate, is added to the electrolyte solution.

When lithium difluorophosphate is contained in the electrolyte solution, the content thereof is preferably not less than 0.01% by weight, more preferably not less than 0.1% by weight, still more preferably not less than 0.2% by weight, but preferably 2% by weight or less, more preferably 1.5% by weight or less, still more preferably 1.4° by weight or less, with respect to the total amount of the electrolyte solution. When the content of lithium difluorophosphate in the electrolyte solution is in this range, the nonaqueous electrolyte secondary battery is likely to exhibit a sufficient cycle characteristics-improving effect, and problems such as deterioration of the high-temperature storage characteristics, an increase in the gas generation, and a reduction in the discharge capacity retention rate are likely to be avoided.

The mechanism in which the charge-discharge efficiency is improved by incorporation of lithium difluorophosphate will now be described.

<Actions and Effects Based on Incorporation of Silicon Oxide Particles (B) and Lithium Difluorophosphate>

Lithium difluorophosphate has polarized P—F bonds and is thus readily attacked by a nucleophile. The silicon oxide particles generate $Li_{22}Si_5$ and $Li_4SiO_4$ when doped with lithium, and nucleophilic $Li_{22}Si_5$ undergoes a nucleophilic substitution reaction with lithium difluorophosphate on the particle surfaces. In this process, the loss of electricity is suppressed since the reaction is not one based on electrochemical reductive decomposition but is a nucleophilic substitution reaction that does not accompany the consumption of electricity. In addition, on the particle surfaces where the nucleophilic substitution reaction took place, Si—P(=)OLi structures are formed and this yields a passive-state coating film, whereby decomposition of the electrolyte component during charging is suppressed. Moreover, since Si—P(=O)OLi is a lithium-containing structure, it does not interfere with the doping of lithium ions, so that the occurrence of an overvoltage can be inhibited. Accordingly, a drastic decrease in the surface potential is inhibited, as a result of which decomposition of the electrolyte component is suppressed. It is believed that the charge-discharge efficiency is improved by these effects.

Particularly, when disproportionated silicon oxide particles having a structure in which zero-valent silicon atoms are unevenly distributed as Si microcrystals in amorphous SiOx are used, the ratio of $Li_{22}Si_5$ is increased when the particles are doped with lithium, and the above-described effects are thereby further enhanced.

<Actions and Effects based on Particle Size Distribution of Negative Electrode Material, and Lithium Difluorophosphate>

By inhibiting the occurrence of an overvoltage in the silicon oxide particles with the use of lithium difluorophosphate, variations in charging can be suppressed, and the amount of change in volume associated with reception and release of Li ions can be reduced. As a result, interfacial displacement of carbonaceous particles and the silicon oxide particles can be made less likely to occur, and a reduction in the discharge capacity can be suppressed. Particularly, in carbon particles having a broad particle size distribution, breakage of conductive path is made less likely to occur, and the effects thereof can be appreciated strongly.

[Separator]

As a separator to be interposed between the positive electrode and the negative electrode, it is preferred to use a porous sheet or nonwoven fabric made of a polyolefin, such as polyethylene or polypropylene.

[Capacity Ratio of Negative Electrode and Positive Electrode]

The nonaqueous secondary battery of the present invention is designed such that the capacity ratio of the negative electrode and the positive electrode (negative electrode/positive electrode) is preferably 1.01 to 1.5, more preferably 1.2 to 1.4.

The nonaqueous secondary battery of the present invention is preferably a lithium ion secondary battery which includes a positive electrode and a negative electrode that are capable of receiving and releasing Li ions, and an electrolyte.

EXAMPLES

The present invention will now be described more concretely by way of Examples thereof; however, the present invention is not restricted to the below-described Examples as long as they do not depart from the gist of the present invention. The values of various production conditions and evaluation results in the below-described Examples each have a meaning as a preferred upper or lower limit value in an embodiment of the present invention, and a preferred range may be defined by a combination of an upper or lower limit value described above and a value described below in an Example, or a combination of values in Examples.

[Methods of Measuring and Evaluating Physical Properties and Characteristics]

[Measurement of Physical Properties of Carbonaceous Particles (A), Silicon Oxide Particles (B) and Negative Electrode Material]

<Particle Size Distribution>

The volume-based particle size distribution was measured for a sample that had been dispersed in a 0.2%-by-weight aqueous solution (about 10 mL) of a surfactant, polyoxyethylene (20) sorbitan monolaurate, using a laser diffraction-scattering particle size distribution analyzer LA-700 (manufactured by HORIBA, Ltd.).

<Tap Density>

The tap density was measured using a powder density meter TAP DENSER KYT-3000 (manufactured by Seishin Enterprise Co., Ltd.). After filling up a 20-cc tap cell with a sample by dropping the sample thereto, the cell was tapped 1,000 times at a stroke length of 10 mm, and the density measured at this point was defined as the tap density.

<Specific Surface Area (BET Method)>

The specific surface area was measured using TriStar 113000 manufactured by Micromeritics Instrument Corp. A sample was vacuum-dried at 150° C. for 1 hour, and the specific surface area was subsequently measured by a multi-point BET method based on nitrogen gas adsorption (five points in a relative pressure range of 0.05 to 0.30).

<Circularity>

Using a flow-type particle image analyzer (FPIA-2000, manufactured by Toa Medical Electronics, Ltd.), the particle size distribution was measured based on equivalent circle diameter, and the average circularity was calculated. Ion exchanged water and polyoxyethylene (20) monolaurate were used as a dispersion medium and a surfactant, respectively. The term "equivalent circle diameter" refers to the diameter of a circle (equivalent circle) having the same projected area as that of a captured particle image, and the term "circularity" refers to a ratio determined by taking the circumferential length of the equivalent circle as the numerator and that of a captured projection image of a particle as the denominator. The circularity values of particles having a measured equivalent diameter in a range of 10 to 40 μm were averaged, and the thus obtained value was defined as the circularity.

[Battery Evaluation]

<Production of Battery I for Performance Evaluation>

Using a hybridization mixer, a slurry was prepared by kneading 97.5% by weight of a mixture of the below-described carbonaceous particles (A) and silicon oxide particles (B) along with 1% by weight of carboxymethyl cellulose (CMC) as a binder and 3.1% by weight of a 48%-by-weight aqueous dispersion of styrene-butadiene rubber (SBR). A 20 μm-thick copper foil was coated with this slurry by a blade method such that a basis weight of 4 to 5 mg/cm² was attained, and this copper foil was subsequently dried.

Thereafter, a negative electrode sheet was obtained by roll-pressing the copper foil such that a negative electrode active substance layer having a density of 1.2 to 1.4 g/cm³ was formed, and a circular piece of 12.5 mm in diameter was punched out from the thus obtained negative electrode sheet and subsequently vacuum-dried at 90° C. for 8 hours, whereby a negative electrode for evaluation was produced.

<Production of Nonaqueous Secondary Battery (Coin-Type Battery)>

The electrode sheet prepared by the above-described method was used as a negative electrode for evaluation, and a lithium metal foil punched out in a disk shape of 15 mm in diameter was used as a counter electrode. Between these electrodes, a separator (made of a porous polyethylene film), which had been impregnated with an electrolyte solution obtained by dissolving $LiPF_6$ in a mixed solvent of ethylene carbonate and ethyl methyl carbonate (volume ratio=3:7) at a concentration of 1 mol/L, was arranged, whereby a coin-type battery I for performance evaluation was produced.

<Discharge Capacity and Efficiency>

Using the nonaqueous secondary battery (coin-type battery) produced by the above-described method, the charge capacity (mAh/g) and the discharge capacity (mAh/g) during charging and discharging of the battery were measured in accordance with the following measurement method.

The lithium counter electrode was charged to 5 mV at a current density of 0.05 C and further charged to a current density of 0.005 C at a constant voltage of 5 mV. After the negative electrode was doped with lithium, the lithium counter electrode was discharged to 1.5 V at a current density of 0.1 C. Three cycles of charging and discharging were performed, taking a combination of the above-described charging and discharging operations as one cycle.

The charge capacity and the discharge capacity were determined as follows. The weight of the copper foil punched out to have the same area as the negative electrode was subtracted from the weight of the negative electrode, and the thus obtained value was multiplied by a coefficient determined from the composition ratio of the negative electrode active substance and the binder so as to determine the weight of the negative electrode active substance. The charge capacity and the discharge capacity in the first cycle were divided by the weight of the negative electrode active substance, whereby the charge capacity per weight and the discharge capacity per weight were determined, respectively.

The thus determined charge capacity (mAh/g) and discharge capacity (mAh/g) were defined as "first charge capacity" (mAh/g) and "first discharge capacity" (mAh/g) of the negative electrode material, respectively.

Further, a value obtained by dividing the discharge capacity (mAh/g) measured in the first cycle by the charge capacity (mAh/g) measured in the first cycle and then multiplying this value by 100 was defined as "first efficiency" (%).

<Discharge Rate Characteristic>

Using the battery I for performance evaluation that had been subjected to the above-described three cycles of charge-discharge operations, the lithium counter electrode was charged to 5 mV at a current density of 0.05 C and further charged to a current value of 0.005 C at a constant voltage of 5 mV. After the negative electrode was doped with lithium, the lithium counter electrode was discharged to 1.5 V at a current density of 0.2 C, followed by additional discharge of remaining Li at 0.1 C. Then, the lithium counter electrode was again charged to 5 mV at a current density of 0.05 C and further charged to a current value of 0.005 C at a constant voltage of 5 mV. After the negative electrode was doped with lithium, the lithium counter electrode was discharged to 1.5 V at a current density of 3 C. A value obtained by dividing the discharge capacity at 3 C by the discharge capacity at 0.2 C was taken as a discharge rate characteristic (3 C/0.2 $C_r$ unit: %).

[Carbonaceous Particles (A)]
<Carbonaceous Particles (A1)>

Using a Model NHS-1 hybridization system manufactured by Nara Machinery Co., Ltd., a flake natural graphite having a d50 value of 100 µm was subjected to a 5-minute mechanical spheroidization treatment at a rotor peripheral speed of 85 m/sec. The resulting sample was classified to obtain spheroidized graphite particles (1) having a d50 value of 7.5 µm. Further, using a Model NHS-1 hybridization system manufactured by Nara Machinery Co., Ltd., a flake natural graphite having a d50 value of 100 µm was subjected to a 10-minute mechanical spheroidization treatment at a rotor peripheral speed of 80 m/sec. The resulting sample was classified to obtain spheroidized graphite particles (2) having a d50 value of 18.9 µm.

To 50 parts by weight of the spheroidized graphite particles (1) and 50 parts by weight of the spheroidized graphite particles (2), 2.0 parts by weight of a carbon black having a primary particle size of 24 nm, a BET specific surface area (SA) of 115 $m^2/g$ and a DBP oil absorption amount of 110 ml/100 g was added, followed by mixing and stirring. The resulting mixed powder was mixed with a petroleum-based heavy oil obtained in naphtha pyrolysis as a carbonaceous material precursor, and the resultant was heat-treated at 1,300° C. in an inert gas, after which the thus obtained calcination product was pulverized and classified, whereby composite carbon particles (A1), in which carbon black fine particles and amorphous carbon were adhered the surfaces of the graphite particles, were obtained.

From the calcination yield, it was confirmed that, in the thus obtained composite carbon particles (A1), the weight ratio of the spheroidized graphite particles and amorphous carbon (spheroidized graphite particles:amorphous carbon) was 1:0.015. The d10, d50, d90, tap density, specific surface area, and circularity were measured by the above-described respective measurement methods. The results thereof are shown in Table 1.

<Carbonaceous Particles (A2)>

To the above-obtained spheroidized graphite particles (1) having a d50 value of 7.5 µm, 2.0% by weight of a carbon black having a primary particle size of 24 nm, a BET specific surface area (SA) of 115 $m^2/g$ and a DBP oil absorption amount of 110 ml/100 g was added, followed by mixing and stirring. The resulting mixed powder was mixed with a petroleum-based heavy oil obtained in naphtha pyrolysis as a carbonaceous material precursor, and the resultant was heat-treated at 1,300° C. in an inert gas, after which the thus obtained calcination product was pulverized and classified, whereby composite carbon particles (A2x), in which carbon black fine particles and amorphous carbon were adhered to the surfaces of the graphite particles, were obtained.

From the calcination yield, it was confirmed that, in the thus obtained composite carbon particles (A2x), the weight ratio of the spheroidized graphite particles and amorphous carbon (spheroidized graphite particles:amorphous carbon) was 1:0.015. Carbon particles (A2) were prepared by mixing and stirring 40 parts by weight of the composite carbon particles (A2x) with 60 parts by weight of the above-obtained spheroidized graphite particles (2) having a d50 value of 18.9 µm. The d10, d50, d90, tap density, specific surface area, and circularity were measured by the above-described respective measurement methods. The results thereof are shown in Table 1.

<Carbonaceous Particles (A3)>

The above-obtained spheroidized graphite particles (1) having a d50 value of 7.5 µm was mixed with a petroleum-based heavy oil obtained in naphtha pyrolysis as a carbonaceous material precursor, and the resultant was heat-treated at 1,300° C. in an inert gas, after which the thus obtained calcination product was pulverized and classified, whereby carbonaceous particles (A3), in which amorphous carbon was adhered to the surfaces of the graphite particles, were obtained.

From the calcination yield, it was confirmed that, in the thus obtained composite carbon particles (A3), the weight ratio of the spheroidized graphite particles and amorphous carbon (spheroidized graphite particles:amorphous carbon) was 1:0.015. The d10, d50, d90, tap density, specific surface area, and circularity were measured by the above-described respective measurement methods. The results thereof are shown in Table 1.

<Carbonaceous Particles (A4)>

The above-obtained spheroidized graphite particles (2) having a d50 value of 18.9 m was mixed with a petroleum-based heavy oil obtained in naphtha pyrolysis as a carbonaceous material precursor, and the resultant was heat-treated at 1,300° C. in an inert gas, after which the thus obtained calcination product was pulverized and classified, whereby carbonaceous particles (A4), in which amorphous carbon was adhered to the surfaces of the graphite particles, were obtained.

From the calcination yield, it was confirmed that, in the thus obtained composite carbon particles (A4), the weight ratio of the spheroidized graphite particles and amorphous carbon (spheroidized graphite particles:amorphous carbon) was 1:0.015. The d10, d50, d90, tap density, specific surface area, and circularity were measured by the above-described respective measurement methods. The results thereof are shown in Table 1.

[Silicon Oxide Particles (B)]
<Silicon Oxide Particles (B1)>

As silicon oxide particles (B1), commercially available silicon oxide particles (SiOx, x=1) (manufactured by OSAKA Titanium Technologies Co., Ltd.) were used. The silicon oxide particles (B1) had a d50 value of 5.6 μm and a BET specific surface area of 3.5 m$^2$/g. No diffraction line attributable to Si(111) in the vicinity of 2θ=28.4° was observable in the X-ray diffraction pattern of the silicon oxide particles (B1); therefore, it was confirmed that the silicon oxide particles (B1) did not contain any zero-valent silicon atom as microcrystals.

<Silicon Oxide Particles (B2)>

Silicon oxide particles (B2) were obtained by heat-treating the silicon oxide particles (B1) at 1,000° C. for 6 hours in an inert atmosphere. A diffraction line attributable to Si(111) in the vicinity of 2θ=28.4° was observable in the X-ray diffraction pattern of the silicon oxide particles (B2); therefore, it was confirmed that the silicon oxide particles (B2) contained zero-valent silicon atoms as microcrystals. It is noted here that the particle size of silicon crystals, which was determined by the Scherrer equation based on the spread of the diffraction line, was 3.2 nm.

<Silicon Oxide Particles (B3)>

As silicon oxide particles (B3), a silicon oxide reagent (d50:15 μm) manufactured by Sigma-Aldrich Co., LLC. was used. The silicon oxide particles (B3) had a d50 value of 16.8 μm and a BET specific surface area of 0.9 m$^2$/g. No diffraction line attributable to Si(111) in the vicinity of 2θ=28.4° was observable in the X-ray diffraction pattern of the silicon oxide particles (B3); therefore, it was confirmed that the silicon oxide particles (B3) did not contain any zero-valent silicon atom as microcrystals.

The physical properties of the silicon oxide particles (B1) to (B3) are summarized in Table 2.

Example 1-1

A mixture was obtained by dry-mixing 90 parts by weight of the carbonaceous particles (A1) with 10 parts by weight of the silicon oxide particles (B1). This mixture was evaluated by the above-described respective measurement methods.

Example 1-2

A mixture was obtained by dry-mixing 90 parts by weight of the carbonaceous particles (A2) with 10 parts by weight of the silicon oxide particles (B1). The same measurements were performed as in Example 1-1.

Example 1-3

A mixture was obtained by dry-mixing 90 parts by weight of the carbonaceous particles (A1) with 10 parts by weight of the silicon oxide particles (B2). The same measurements were performed as in Example 1-1.

Example 1-4

A mixture was obtained by dry-mixing 90 parts by weight of the carbonaceous particles (A1) with 10 parts by weight of the silicon oxide particles (B3). The same measurements were performed as in Example 1-1.

Comparative Example 1-1

A mixture was obtained by dry-mixing 90 parts by weight of the carbonaceous particles (A3) with 10 parts by weight of the silicon oxide particles (B1). The same measurements were performed as in Example 1-1.

Comparative Example 1-2

A mixture was obtained by dry-mixing 90 parts by weight of the carbonaceous particles (A4) with 10 parts by weight of the silicon oxide particles (B3). The same measurements were performed as in Example 1-1.

The physical properties of the mixtures obtained in Examples 1-1 to 1-4 and Comparative Examples 1-1 and 1-2 are summarized in Table 3.

For each of batteries I for performance evaluation that were produced in accordance with the method described above in the section of <Production of Nonaqueous Secondary Battery (Coin-Type Battery)> using the respective mixtures obtained in Examples 1-1 to 1-4 and Comparative Examples 1-1 and 1-2, the first charge capacity, first discharge capacity, first efficiency and discharge rate characteristic were evaluated. The results thereof are summarized in Table 4.

TABLE 1

| | $d50_a$ (μm) | $d90_a$ (μm) | $d10_a$ (μm) | $d90_a/d10_a$ | $d50_a/d10_a$ | Specific surface area ($m^2/g$) | Tap density ($g/cm^3$) | Circularity |
|---|---|---|---|---|---|---|---|---|
| Carbonaceous particles (A1) | 11.8 | 24.9 | 6.2 | 4.0 | 1.9 | 6.1 | 1.16 | 0.92 |
| Carbonaceous particles (A2) | 13.7 | 28.3 | 6.7 | 4.2 | 2.0 | 6.5 | 1.12 | 0.92 |
| Carbonaceous particles (A3) | 7.7 | 11.7 | 5.2 | 2.3 | 1.5 | 6.0 | 1.05 | 0.92 |
| Carbonaceous particles (A4) | 19.1 | 29.8 | 12.4 | 2.4 | 1.5 | 3.4 | 1.14 | 0.93 |

TABLE 2

| | $d50_b$ (μm) | $d90_b$ (μm) | $d10_b$ (μm) | $d90_b/d10_b$ | $d50_b/d10_b$ | Specific surface area ($m^2/g$) | Si crystal diameter (nm) |
|---|---|---|---|---|---|---|---|
| Silicon oxide particles (B1) | 5.6 | 11.9 | 1.7 | 7.0 | 3.3 | 3.5 | — |
| Silicon oxide particles (B2) | 5.4 | 11.0 | 1.6 | 6.7 | 3.3 | 2.1 | 3.2 |
| Silicon oxide particles (B3) | 16.8 | 39.6 | 5.7 | 7.0 | 3.0 | 0.9 | — |

TABLE 3

| | d50 (μm) | d90 (μm) | d10 (μm) | d90/d10 | d50/d10 | $d50_b/d50_a$ | $d50_b/d10_a$ | Specific surface area ($m^2/g$) |
|---|---|---|---|---|---|---|---|---|
| Example 1-1 | 11.1 | 23.2 | 5.4 | 4.3 | 2.1 | 0.5 | 0.9 | 5.8 |
| Example 1-2 | 12.9 | 27.9 | 5.8 | 4.8 | 2.2 | 0.4 | 0.8 | 6.2 |
| Example 1-3 | 11.3 | 24.5 | 5.4 | 4.6 | 2.1 | 0.5 | 0.9 | 5.7 |
| Example 1-4 | 12.6 | 27.4 | 6.4 | 4.3 | 2.0 | 1.4 | 2.7 | 5.6 |
| Comparative Example 1-1 | 7.7 | 12.2 | 4.9 | 2.5 | 1.6 | 0.7 | 1.1 | 5.7 |
| Comparative Example 1-2 | 19.3 | 31.5 | 12.1 | 2.6 | 1.6 | 0.9 | 1.4 | 3.1 |

The followings are seen from Table 4.

1) Comparing Examples 1-1 and 1-2 with Comparative Example 1-1, it is seen that the charge-discharge capacity, the efficiency and the discharge rate characteristic, particularly the discharge rate characteristic, were superior in those cases where the carbonaceous particles mixed with the silicon oxide particles (B1) were the carbonaceous particles (A1) (R1=4.3, R2=2.1) or the carbonaceous particles (A2) (R1=4.8, R2=2.2) than in the case where the carbonaceous particles (A3) were mixed with the silicon oxide particles (B1) (R1=2.5, R2=1.6).

2) Comparing Examples 1-4 and Comparative Example 1-2, it is seen that the charge-discharge capacity, the efficiency and the discharge rate characteristic were all superior in the case where the carbonaceous particles mixed with the silicon oxide particles (B3) were the carbonaceous particles (A1) (R1=4.3, R2=2.0) than in the case where the carbonaceous particles (A4) were mixed with the silicon oxide particles (B3) (R1=2.6, R2=1.6).

<Production of Battery II for Performance Evaluation>

Using a hybridization mixer, a slurry was prepared by kneading 97.5% by weight of a mixture of carbonaceous particles and silicon oxide particles (weight ratio=9:1) along with 1% by weight of carboxymethyl cellulose (CMC) as a binder and 3.1% by weight of a 48%-by-weight aqueous dispersion of styrene-butadiene rubber (SBR). A 20 μm-thick copper foil was coated with this slurry by a blade method such that a basis weight of 4 to 5 $mg/cm^2$ was attained, and this copper foil was subsequently dried.

TABLE 4

| | Carbonaceous particles | Silicon oxide particles | First charge capacity (mAh/g) | First discharge capacity (mAh/g) | First efficiency (%) | Discharge rate characteristic (%) |
|---|---|---|---|---|---|---|
| Example 1-1 | A1 | B1 | 584 | 417 | 71.4 | 91 |
| Example 1-2 | A2 | B1 | 567 | 407 | 71.8 | 89 |
| Example 1-3 | A1 | B2 | 562 | 405 | 72.1 | 89 |
| Example 1-4 | A1 | B3 | 586 | 422 | 72.1 | 92 |
| Comparative Example 1-1 | A3 | B1 | 563 | 402 | 71.3 | 73 |
| Comparative Example 1-2 | A4 | B3 | 557 | 395 | 71.0 | 86 |

Thereafter, a negative electrode sheet was obtained by roll-pressing the copper foil such that a negative electrode active substance layer having a density of 1.2 to 1.4 g/cm³ was formed, and a circular piece of 12.5 mm in diameter was punched out from the thus obtained negative electrode sheet and subsequently vacuum-dried at 90° C. for 8 hours, whereby a negative electrode for evaluation was produced.

<Production of Electrolyte Solution>

Under a dry argon atmosphere, dried $LiPF_6$ was dissolved at a ratio of 1.0 mol/L in a mixture of ethylene carbonate and ethyl methyl carbonate (volume ratio=3:7) to prepare a reference electrolyte solution. To this reference electrolyte solution, lithium difluorophosphate was mixed at a ratio of 0.50% by mass, whereby an electrolyte solution (E2) was obtained.

Further, under a dry argon atmosphere, dried $LiPF_6$ and lithium difluorophosphate were dissolved at ratios of 1.2 mol/L and 0.05 mol/L, respectively, in a mixture of ethylene carbonate, ethyl methyl carbonate, dimethyl carbonate, methyl acetate, fluoroethylene carbonate, vinylene carbonate and methyl phenyl carbonate (volume ratio=10:3:32:45:5:3:2), whereby an electrolyte solution (E3) was obtained.

<Production of Nonaqueous Secondary Battery (Coin-Type Battery)>

The electrode sheet prepared by the above-described method was used as a negative electrode for evaluation, and a lithium metal foil punched out in a disk shape of 15 mm in diameter was used as a counter electrode. Between these electrodes, a separator (made of a porous polyethylene film) which had been impregnated with the above-described electrolyte solution was arranged, whereby a coin-type battery II for performance evaluation was produced.

<Efficiency Improvement Degree>

Using the nonaqueous secondary battery (coin-type battery) produced by the above-described method, the efficiency improvement degree was measured by the following measurement method.

The lithium counter electrode was charged to 5 mV at a current density of 0.05 C and further charged to a current density of 0.005 C at a constant voltage of 5 mV. After the negative electrode was doped with lithium, the lithium counter electrode was discharged to 1.5 V at a current density of 0.1 C.

A value obtained by dividing the discharge capacity (mAh) measured in the first cycle by the charge capacity (mAh) measured in the first cycle was defined as "efficiency". A value obtained by subtracting the efficiency with the use of the reference electrolyte solution from the efficiency with the use of the electrolyte solution E2 or E3 was defined as "efficiency improvement degree".

Reference Example 2-1

Using the carbonaceous particles (A1) and the silicon oxide particles (B1) as the above-described carbonaceous particles and silicon oxide particles, respectively, the efficiency improvement degree of the electrolyte solution E2 with respect to the reference electrolyte solution was determined. It is noted here that, in the below-described Examples and Comparative Examples, the efficiency improvement degree was calculated as an absolute value, taking the value determined in this Reference Example 2-1 as 100. The results thereof are shown in Table 5.

Reference Example 2-2

Using the carbonaceous particles (A2) and the silicon oxide particles (B1) as the above-described carbonaceous particles and silicon oxide particles, respectively, the efficiency improvement degree of the electrolyte solution E2 with respect to the reference electrolyte solution was determined. The result thereof is shown in Table 5.

Reference Example 2-3

Using the carbonaceous particles (A1) and the silicon oxide particles (B2) as the above-described carbonaceous particles and silicon oxide particles, respectively, the efficiency improvement degree of the electrolyte solution E2 with respect to the reference electrolyte solution was determined. The result thereof is shown in Table 5.

Reference Example 2-4

Using the carbonaceous particles (A1) and the silicon oxide particles (B2) as the above-described carbonaceous particles and silicon oxide particles, respectively, the efficiency improvement degree of the electrolyte solution E3 with respect to the reference electrolyte solution was determined. The result thereof is shown in Table 5.

Reference Example 2-5

Using the carbonaceous particles (A3) and the silicon oxide particles (B1) as the above-described carbonaceous particles and silicon oxide particles, respectively, the efficiency improvement degree of the electrolyte solution E2 with respect to the reference electrolyte solution was determined. The result thereof is shown in Table 5.

TABLE 5

| | Carbonaceous particles | Silicon oxide particles | Electrolyte solution | Efficiency improvement degree |
|---|---|---|---|---|
| Reference Example 2-1 | A1 | B1 | E2 | 100 |
| Reference Example 2-2 | A2 | B1 | E2 | 117 |
| Reference Example 2-3 | A1 | B2 | E2 | 148 |
| Reference Example 2-4 | A1 | B2 | E3 | 157 |
| Reference Example 2-5 | A3 | B1 | E2 | 91 |

From Table 5, the followings are seen.
1) Comparing Reference Example 2-1 and Reference Example 2-2, it is seen that the effect of improving the charge-discharge efficiency was enhanced by changing the carbonaceous particles (A1) to the carbonaceous particles (A2).
2) Comparing Reference Example 2-3 and Reference Example 2-4, it is seen that the effect of improving the charge-discharge efficiency can be obtained even when a component other than lithium difluorophosphate was incorporated into the electrolyte solution.

What is claimed is:
1. A negative electrode material for nonaqueous secondary batteries, the negative electrode material comprising carbonaceous particles (A) and silicon oxide particles (B), wherein both the carbonaceous particles (A) and the silicon oxide particles (B) satisfy the following a) to c):
   a) the average particle size (50% cumulative particle size from the smaller particle side; d50) is 3 μm to 30 μm, and the 10% cumulative particle size from the smaller particle side (d10) is 0.1 μm to 10 μm;

b) the ratio (R1=(d90/d10) between the 90% cumulative particle size from the smaller particle side (d90) and the d10 is 3 to 20; and c) the ratio (R2=(d50/d10) between the d50 and the d10 is 1.7 to 5, wherein the carbonaceous particles (A) comprise natural graphite, the carbonaceous particles (A) do not contain an artificial graphite, and the carbonaceous particles (A) have a specific surface area of 20 m$^2$/g or smaller.

2. The negative electrode material for nonaqueous secondary batteries according to claim 1, wherein the ratio (R3=(d50$_b$/d50$_a$) between the average particle size of the silicon oxide particles (B) (50% cumulative particle size from the smaller particle side; d50$_b$) and the average particle size of the carbonaceous particles (A) (50% cumulative particle size from the smaller particle side; d50$_a$) is 0.01 to 1.

3. The negative electrode material for nonaqueous secondary batteries according to claim 1, wherein the ratio (R4=d50$_b$/d10$_a$) between the d50$_b$ of the silicon oxide particles (B) and the 10% cumulative particle size from the smaller particle side (d10$_a$) of the carbonaceous particles (A) is 0.01 to 2.

4. The negative electrode material for nonaqueous secondary batteries according to claim 1, wherein, with regard to the carbonaceous particles (A), the d50$_a$ is 5 μm to 30 μm, and the ratio (R1$_a$=d90$_a$/d10$_a$) between the 90% cumulative particle size from the smaller particle side (d90$_a$) and the 10% cumulative particle size from the smaller particle side (d10$_a$) is 3 to 10.

5. The negative electrode material for nonaqueous secondary batteries according to claim 1, wherein, with regard to the silicon oxide particles (B), the d50$_b$ is 0.1 μm to 20 μm, and the ratio (R1$_b$=d90$_b$/d10$_b$) between the 90% cumulative particle size from the smaller particle side (d90$_b$) and the 10% cumulative particle size from the smaller particle side (d10$_b$) is 3 to 15.

6. The negative electrode material for nonaqueous secondary batteries according to claim 1, wherein the 10% cumulative particle size from the smaller particle side (d10$_b$) of the silicon oxide particles (B) is 0.001 μm to 6 μm.

7. The negative electrode material for nonaqueous secondary batteries according to claim 1, comprising the carbonaceous particles (A) and the silicon oxide particles (B) at a ratio of 30:70 to 99:1 ([weight of carbonaceous particles (A)]:[weight of silicon oxide particles (B)]).

8. The negative electrode material for nonaqueous secondary batteries according to claim 1, wherein the carbonaceous particles (A) have a circularity of 0.88 or higher as determined by a flow-type particle image analysis.

9. The negative electrode material for nonaqueous secondary batteries according to claim 1, wherein the carbonaceous particles (A) comprise a spheroidized graphite.

10. The negative electrode material for nonaqueous secondary batteries according to claim 1, wherein the ratio (M$_O$/M$_{Si}$) of the number of oxygen atoms (Mo) with respect to the number of silicon atoms (M$_{Si}$) in the silicon oxide particles (B) is 0.5 to 1.6.

11. The negative electrode material for nonaqueous secondary batteries according to claim 1, wherein the silicon oxide particles (B) comprise zero-valent silicon atoms.

12. The negative electrode material for nonaqueous secondary batteries according to claim 1, comprising silicon microcrystals in the silicon oxide particles (B).

13. A negative electrode for nonaqueous secondary batteries, the negative electrode comprising:

a current collector; and an active substance layer formed on the current collector, wherein the active substance layer comprises the negative electrode material for nonaqueous secondary batteries according to claim 1.

14. A nonaqueous secondary battery comprising:

a positive electrode;

a negative electrode; and an electrolyte, wherein the negative electrode is the negative electrode for nonaqueous secondary batteries according to claim 13.

15. The nonaqueous secondary battery according to claim 14, wherein the electrolyte is an electrolyte solution contained in a nonaqueous solvent.

16. The nonaqueous secondary battery according to claim 15, wherein the electrolyte solution contains lithium difluorophosphate, and the content thereof is 0.01% by weight to 2% by weight with respect to the whole electrolyte solution.

* * * * *